United States Patent [19]
Martin et al.

[11] Patent Number: 5,813,826
[45] Date of Patent: Sep. 29, 1998

[54] BOTTOM SHEET DISPENSER FOR LOAD FORMING MACHINERY

[75] Inventors: Merrill D. Martin, Oakland; Daniel J. Talken, Lafayette, both of Calif.

[73] Assignee: Martain Family Trust, Oakland, Calif.

[21] Appl. No.: 802,993

[22] Filed: Feb. 21, 1997

[51] Int. Cl.[6] .................................................. B65G 59/04
[52] U.S. Cl. ...................... 414/797; 414/795.7; 414/268; 414/900; 271/9.07; 271/9.11
[58] Field of Search ................................. 414/795.7, 797, 414/789.5, 789.6, 900, 927, 268, 277; 271/9.07, 9.11, 11, 171

[56] References Cited

U.S. PATENT DOCUMENTS

| | | |
|---|---|---|
| Re. 35,066 | 10/1995 | Martin . |
| 1,579,469 | 4/1926 | Cooper .................................... 271/9.11 |
| 4,009,957 | 3/1977 | Suzuki et al. ............................ 271/9.11 |
| 4,108,427 | 8/1978 | Komori et al. .......................... 271/9.11 |
| 4,735,539 | 4/1988 | Hakkinen . |
| 4,744,198 | 5/1988 | Hood . |
| 4,759,679 | 7/1988 | Muller . |
| 4,770,403 | 9/1988 | Katsumata et al. ..................... 271/9.07 |
| 4,775,277 | 10/1988 | Zeleny . |
| 4,984,260 | 1/1991 | Koyama .................................. 271/9.07 |
| 4,993,907 | 2/1991 | Clark . |
| 5,080,343 | 1/1992 | Kushima et al. ........................ 271/9.07 |
| 5,193,967 | 3/1993 | Sartorio . |
| 5,328,316 | 7/1994 | Hoffmann ................................ 414/277 |
| 5,355,205 | 10/1994 | Toyama et al. ......................... 271/9.11 |
| 5,358,375 | 10/1994 | Kawada et al. ......................... 414/277 |

FOREIGN PATENT DOCUMENTS

| | | | |
|---|---|---|---|
| 0193797 | 9/1986 | European Pat. Off. ................ | 414/797 |

*Primary Examiner*—Karen M. Young
*Assistant Examiner*—Douglas Hess
*Attorney, Agent, or Firm*—James R. Cypher

[57] ABSTRACT

A bottom sheet storage and feeder apparatus for use with one or more load forming or stacking machines for the purpose of providing one or more bottom sheets for protecting the load. The apparatus chooses a bottom sheet stored in one of a plurality of vertically stacked bins and sequentially moves one or more of the individual bottom sheets longitudinally to a destination location in a plurality of lay down patterns. The machine is constructed with a frame which supports a plurality of vertically spaced storage bins. A lifting assembly, transported by a transfer assembly, includes at least one laterally positioned vacuum member which engages and lifts an individual bottom sheet from one of the storage bins and delivers the selected bottom sheet to a destination location in a selected lay down position. Several lay down patterns may be made by subsequent cycles of the lift and transfer assembly from the storage bins to the destination location.

19 Claims, 16 Drawing Sheets

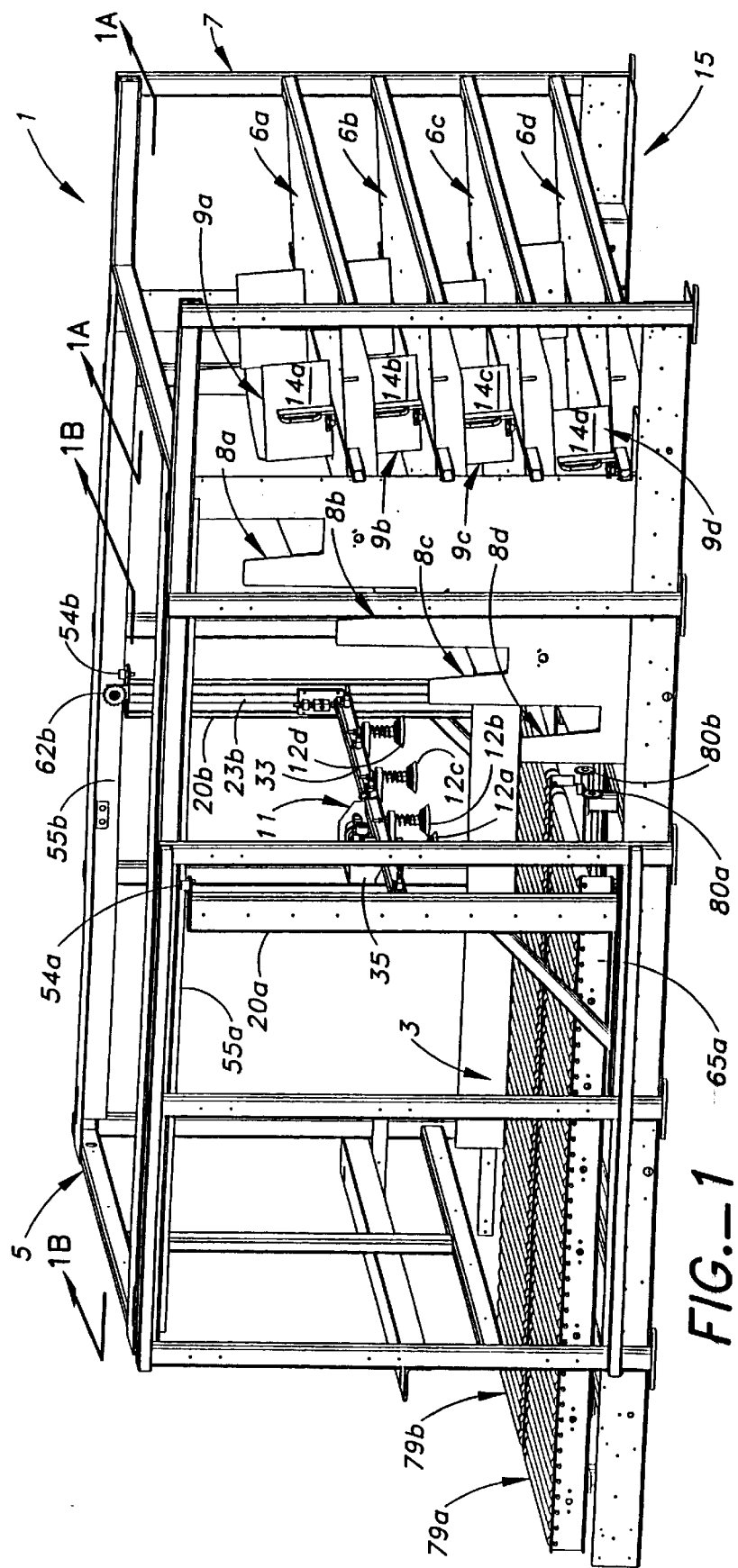
FIG._1

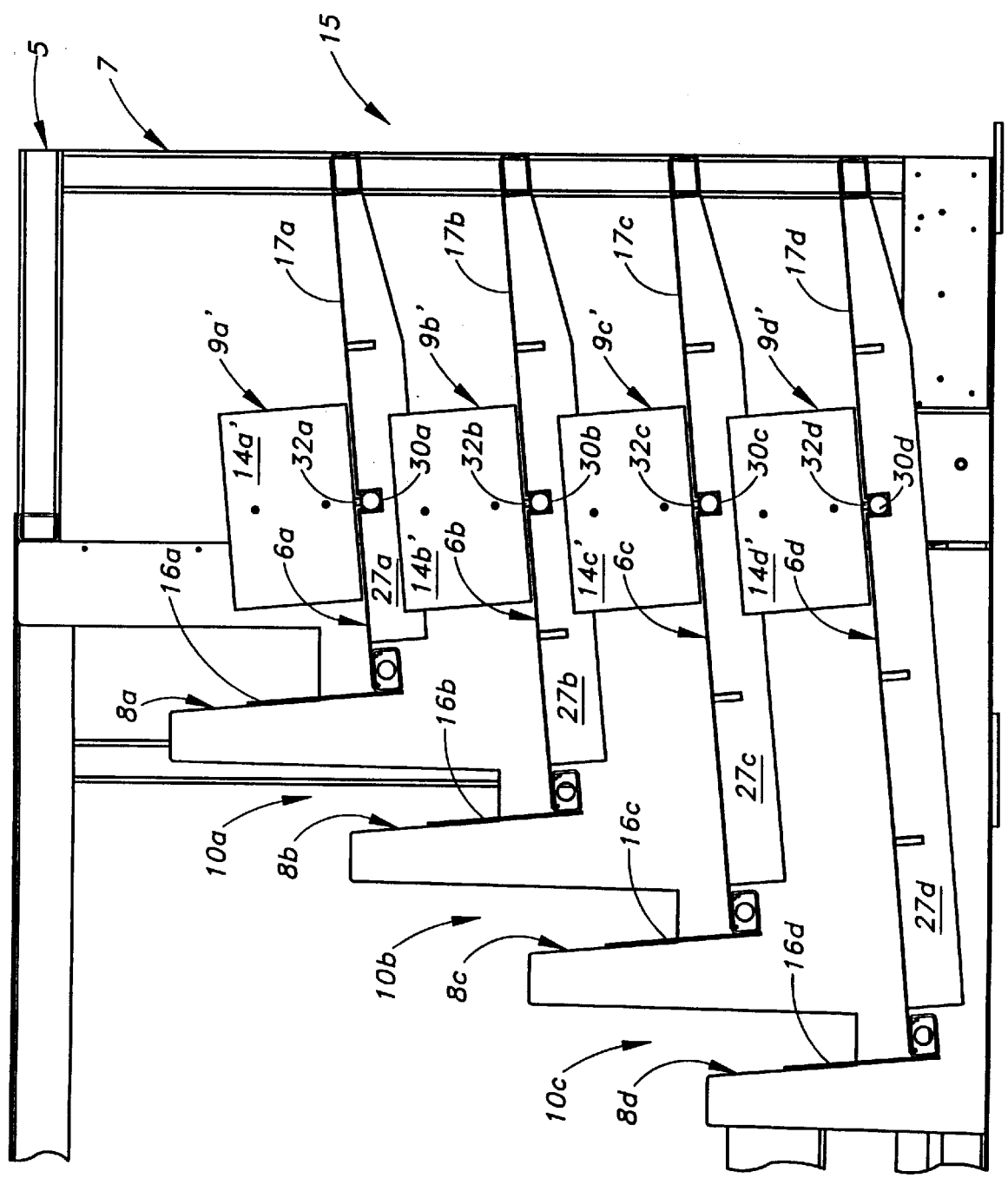
FIG._1A

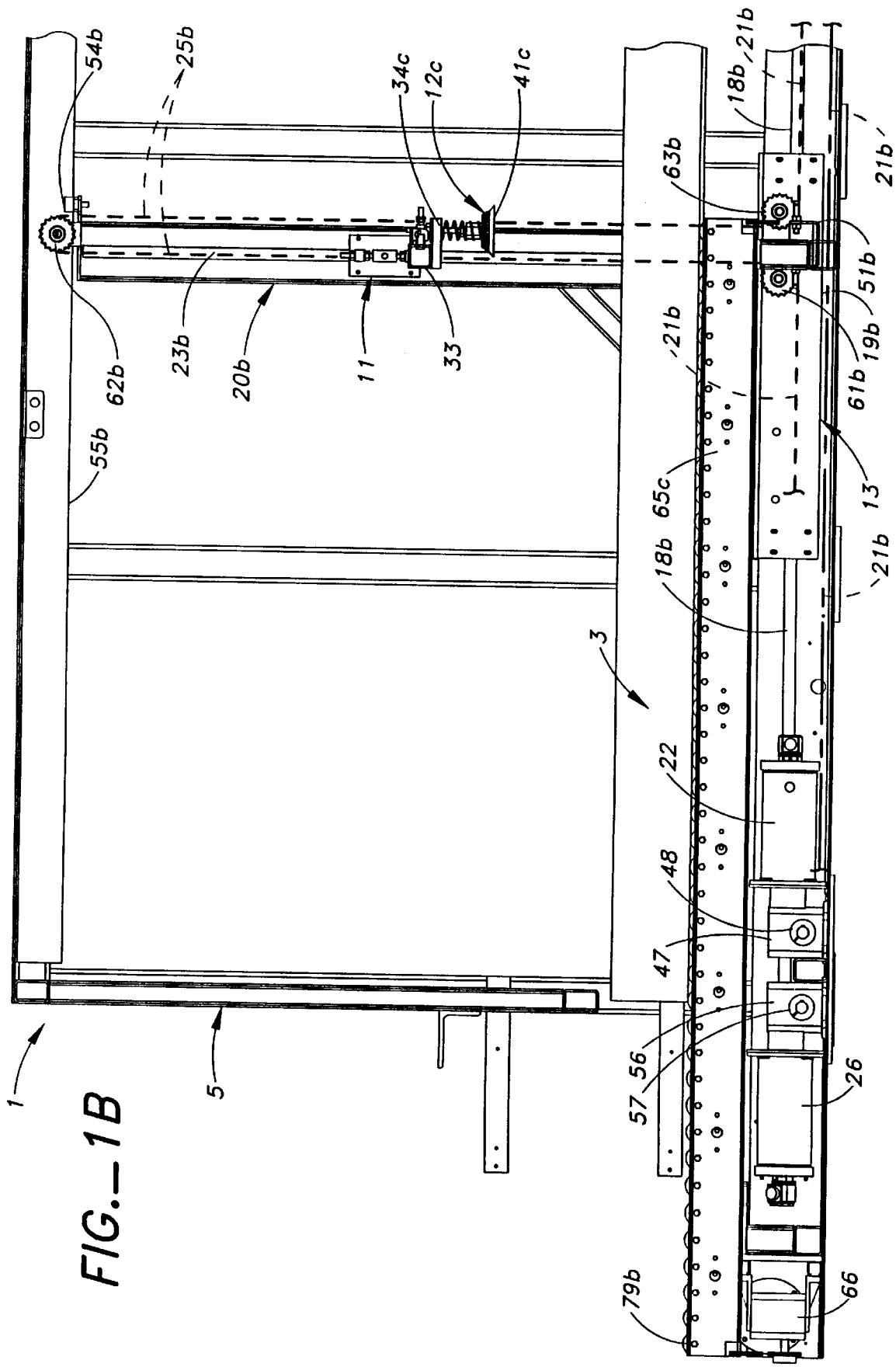

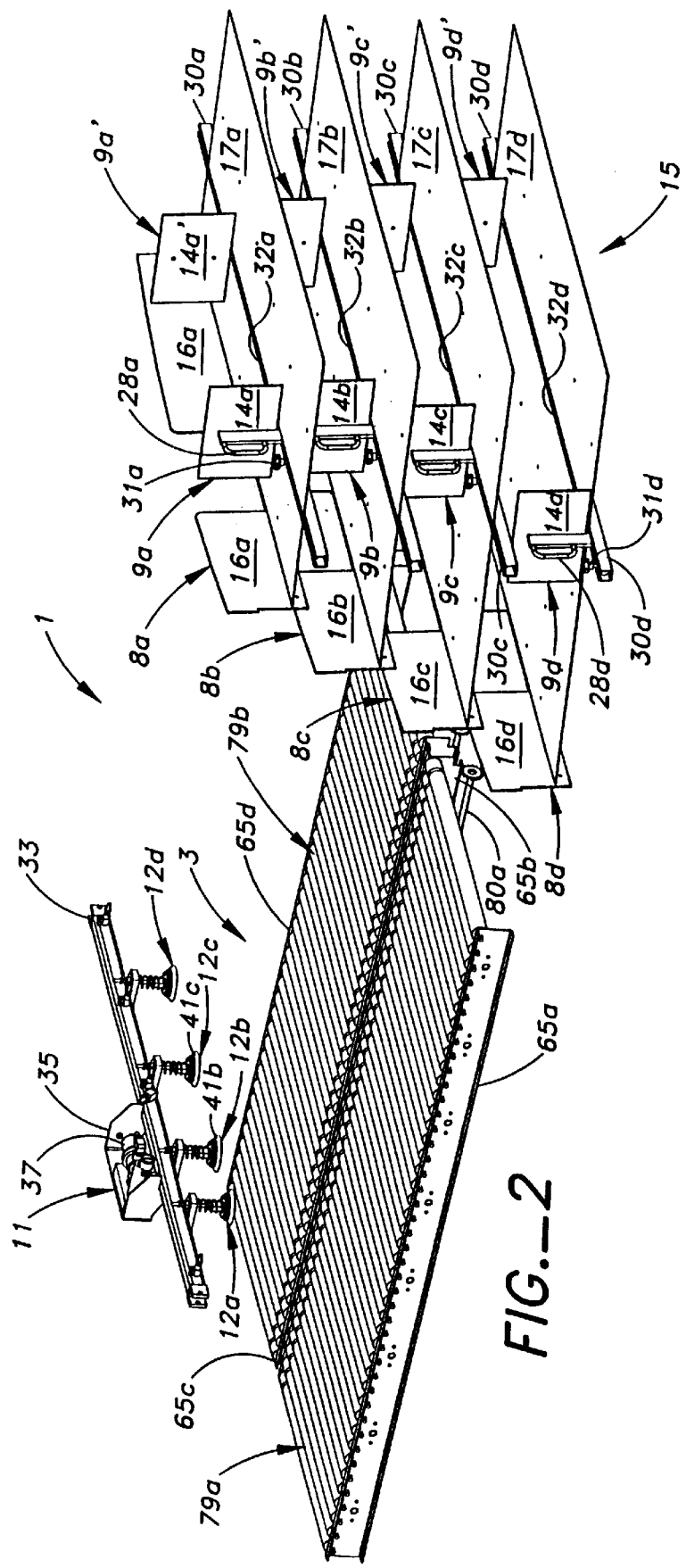
FIG._2

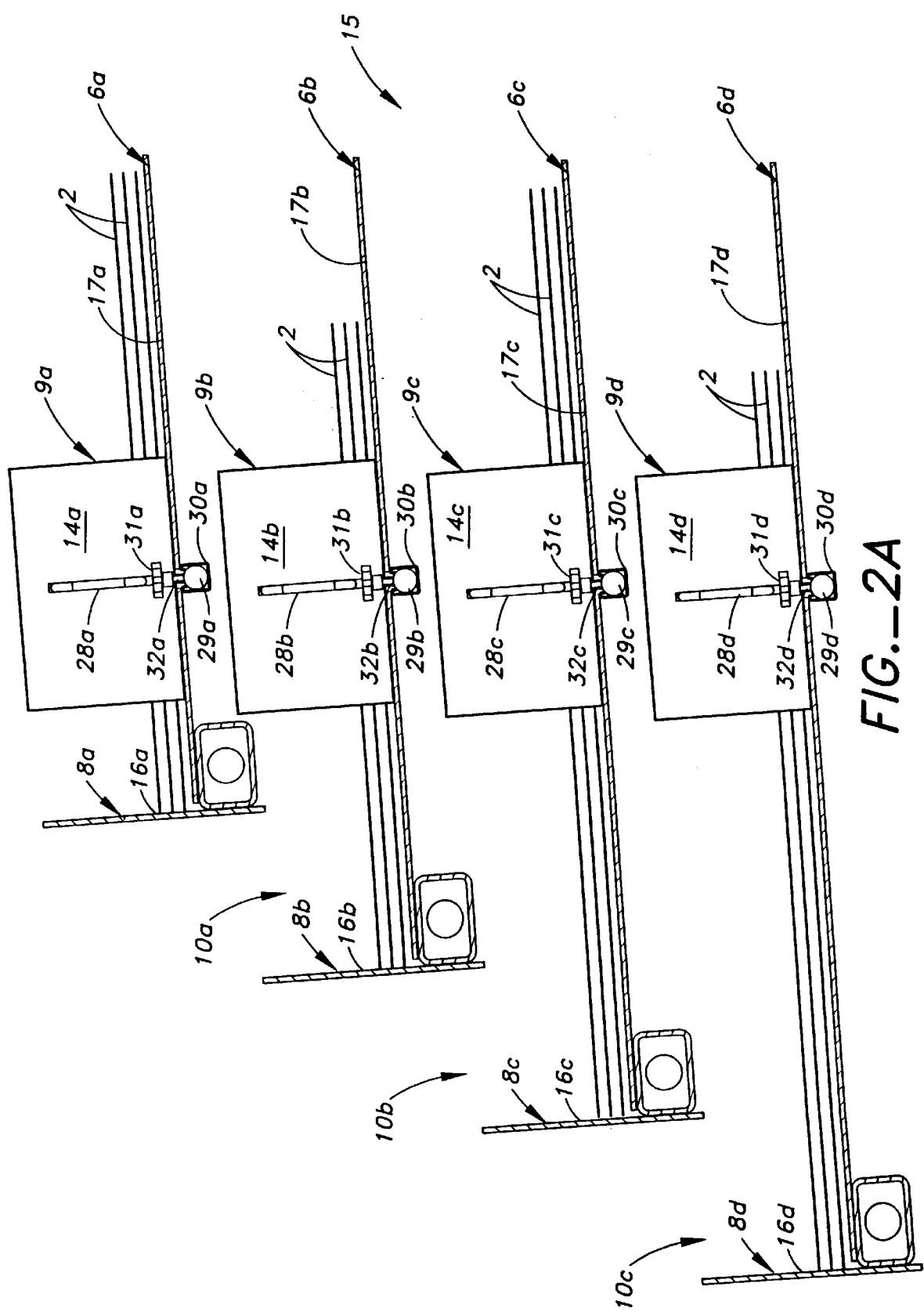
FIG._2A

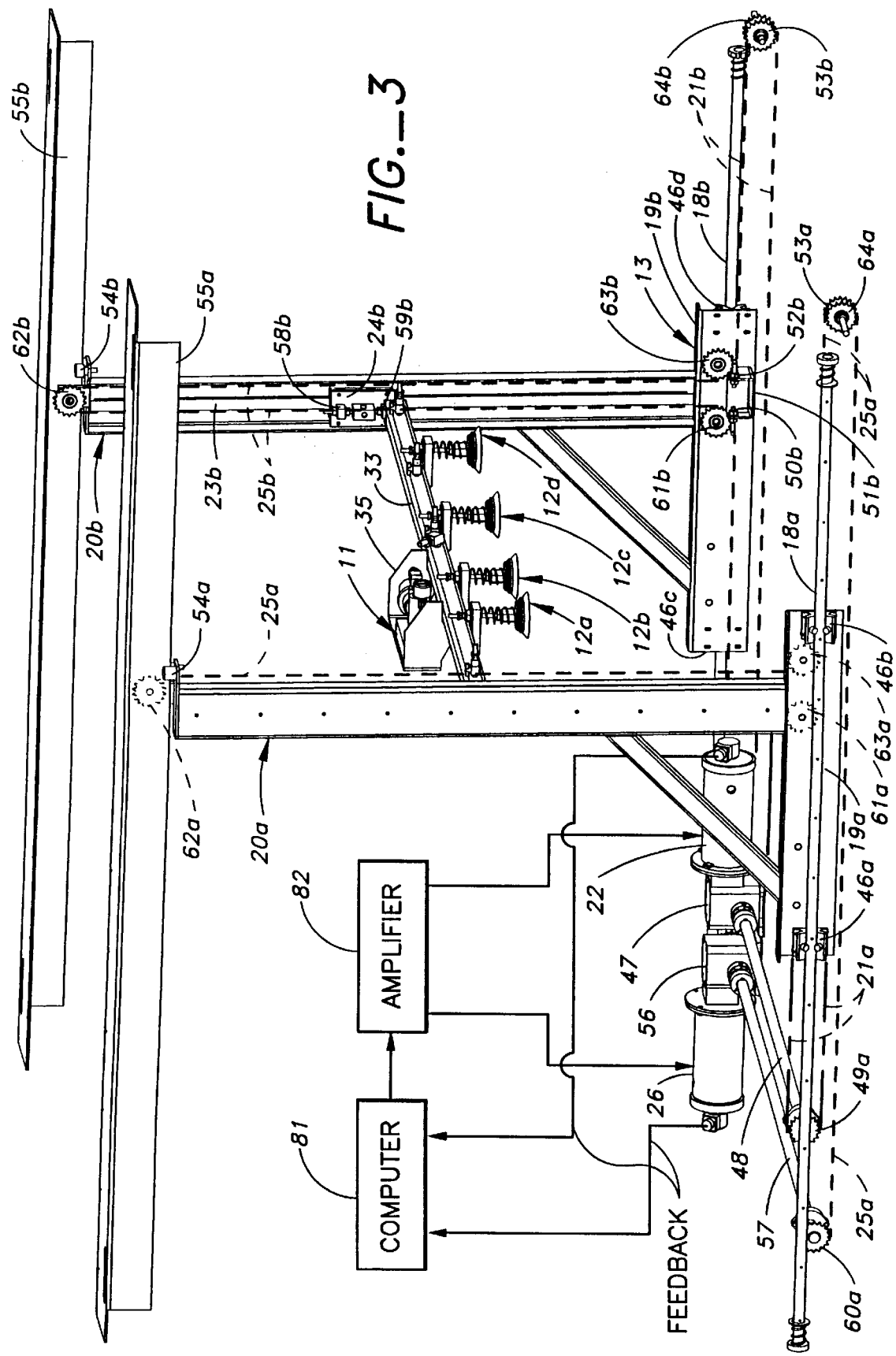

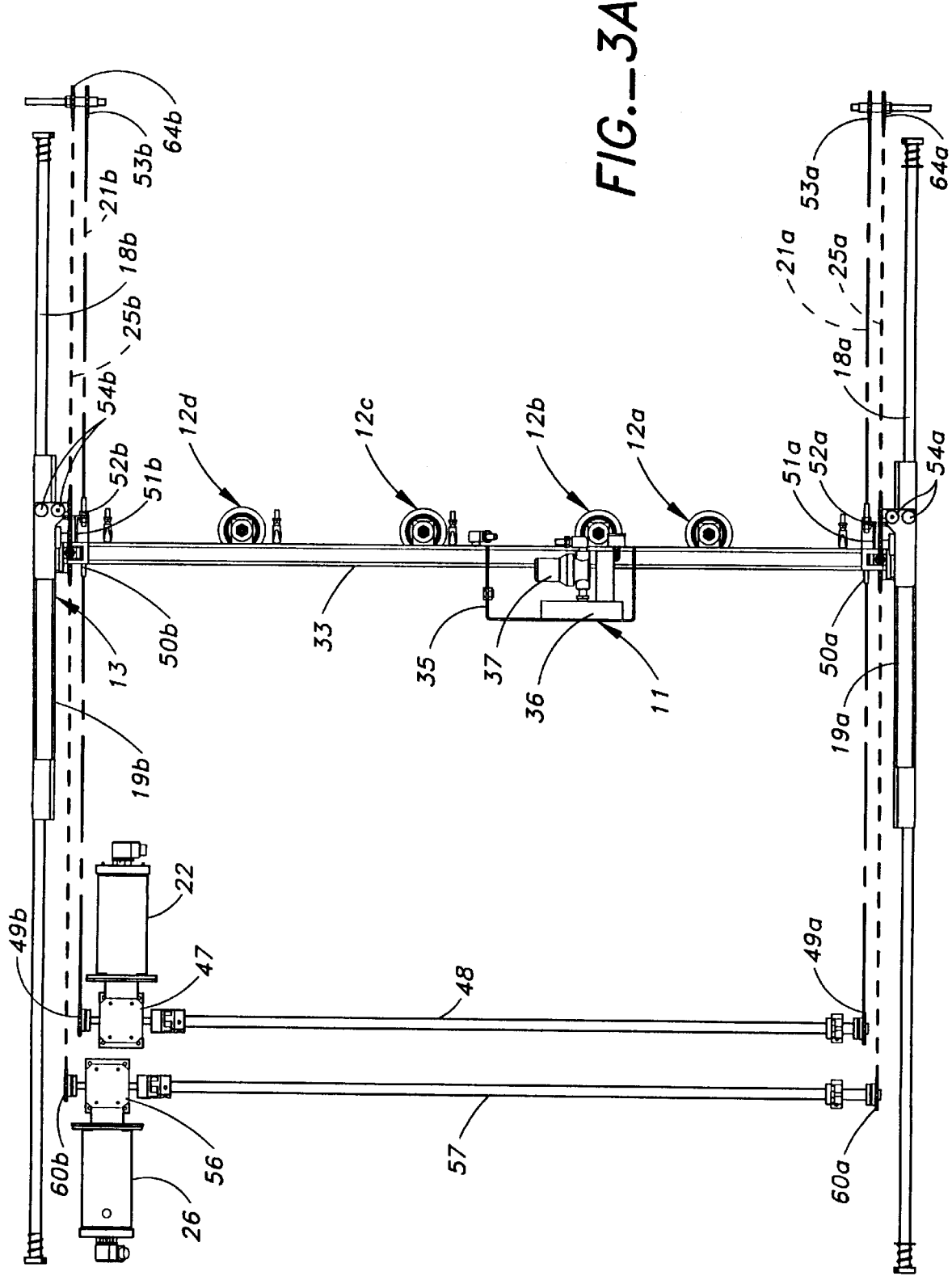

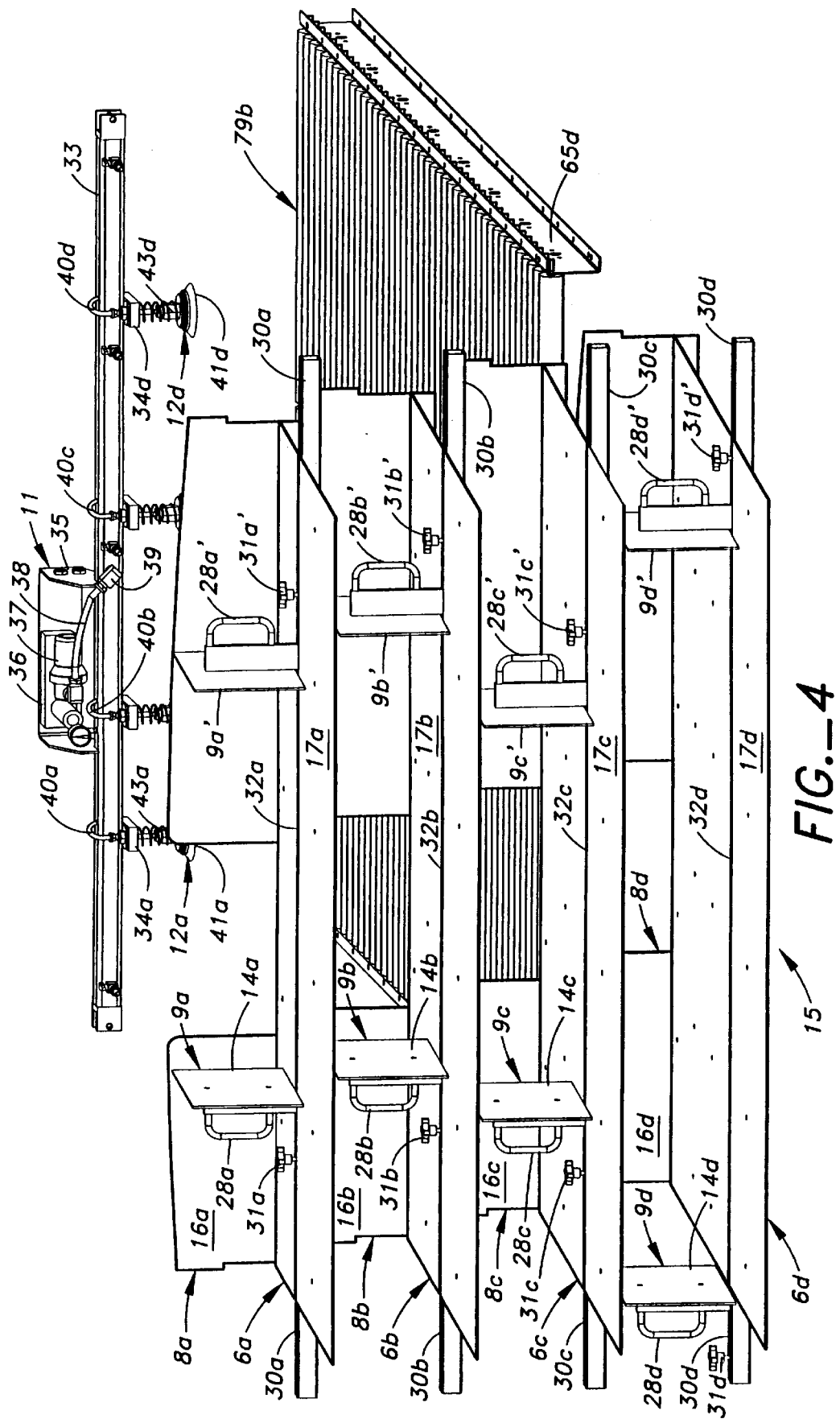
FIG._4

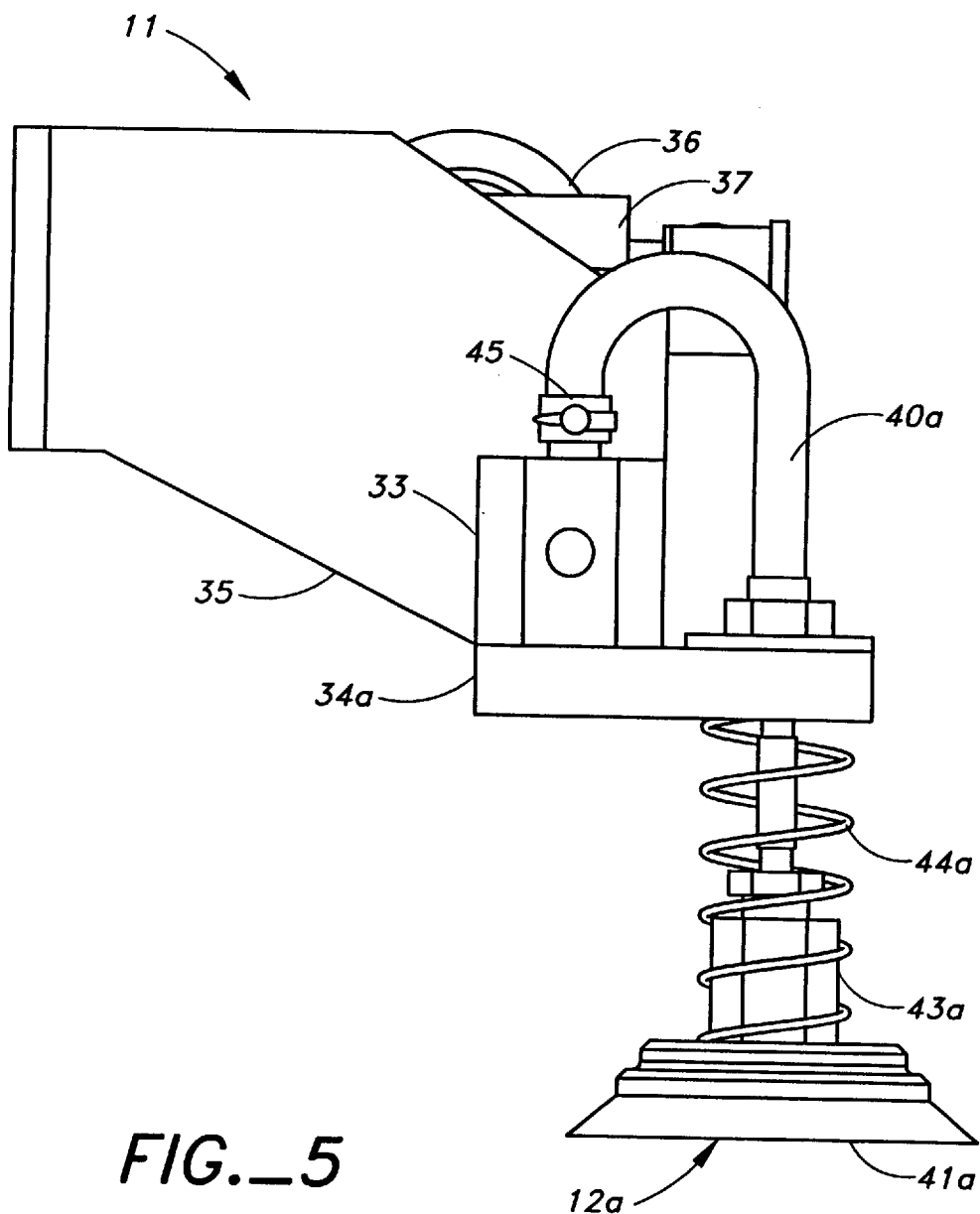
FIG._5

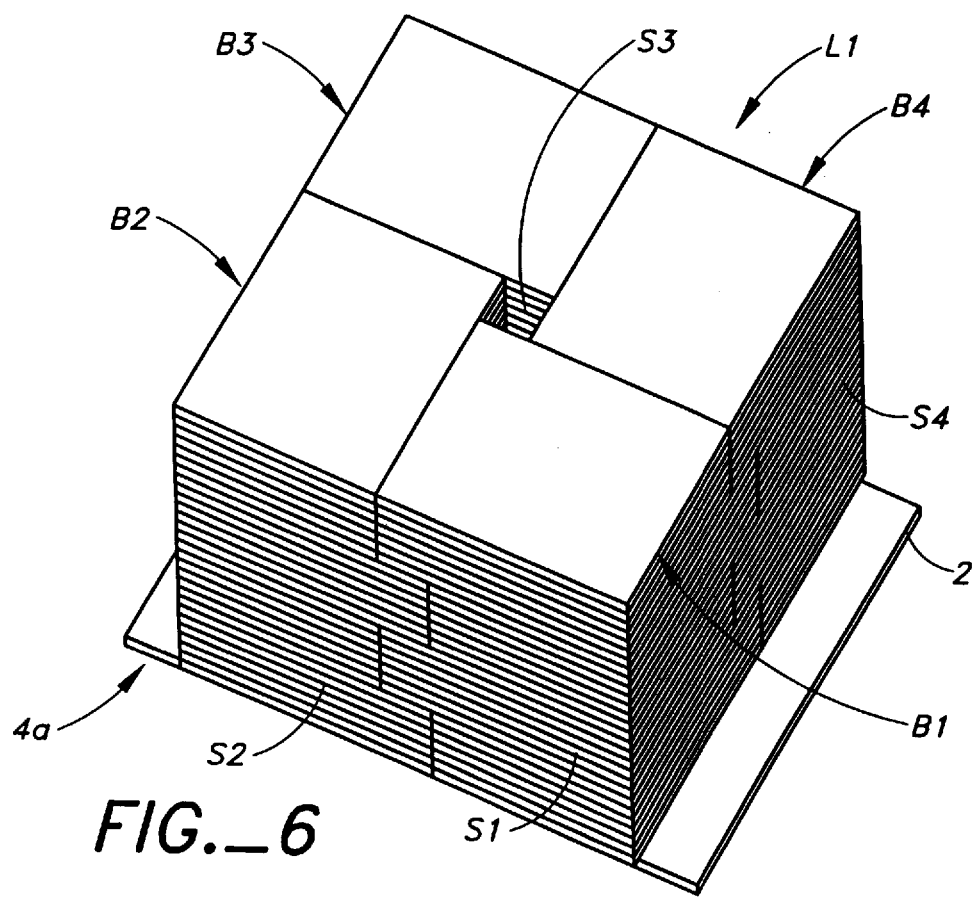
FIG._6
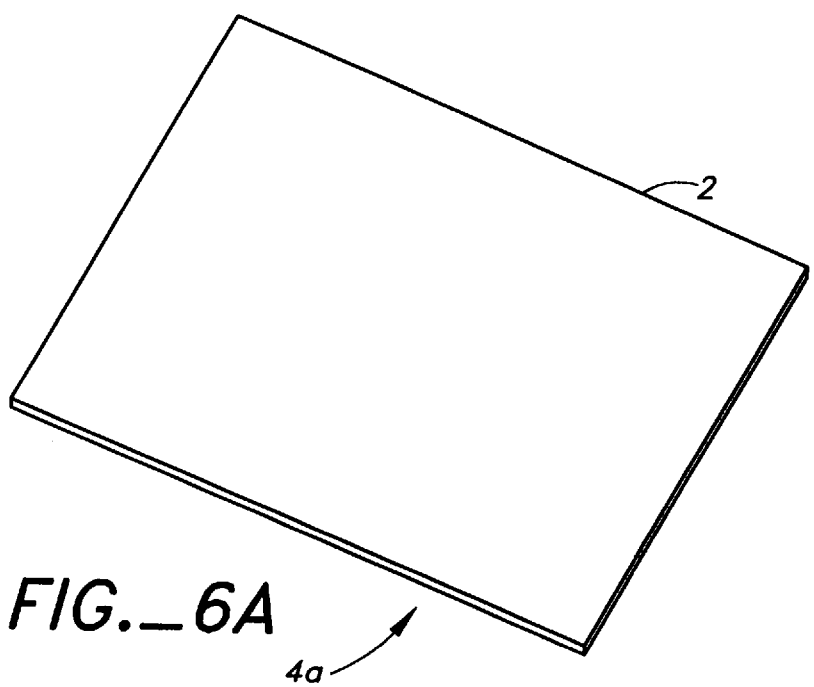
FIG._6A

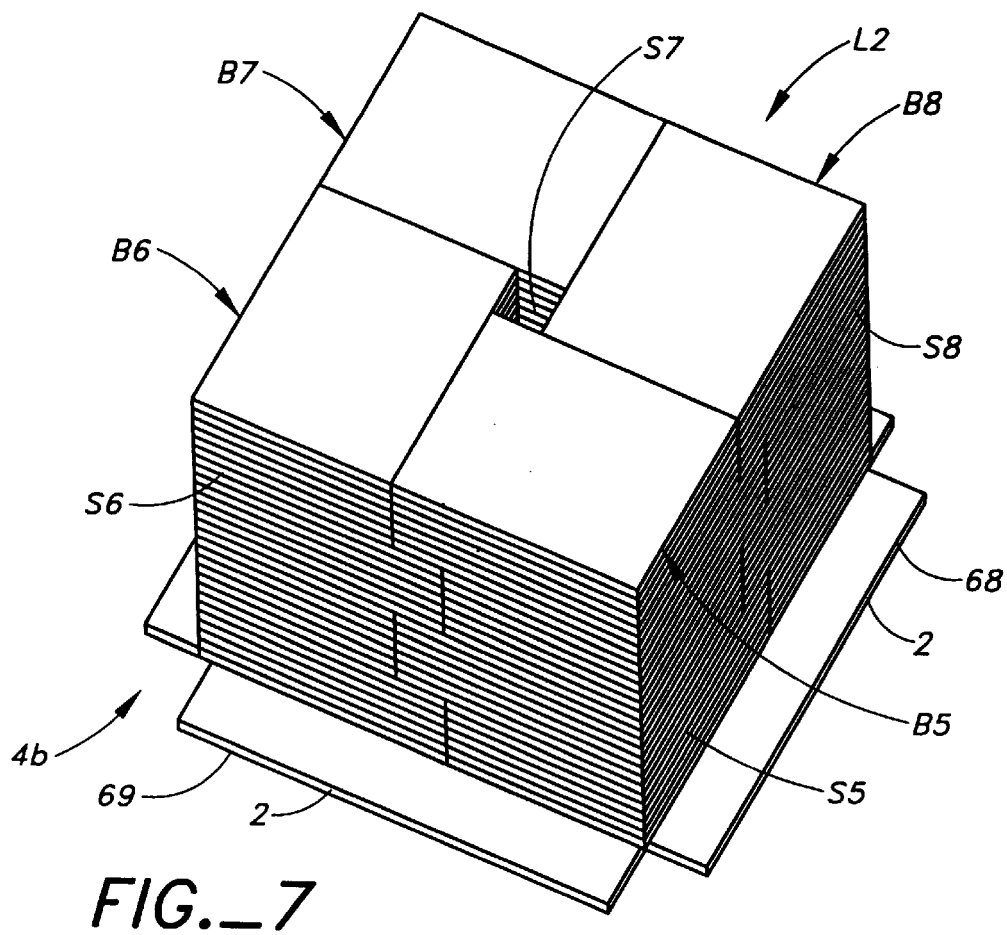
FIG._7
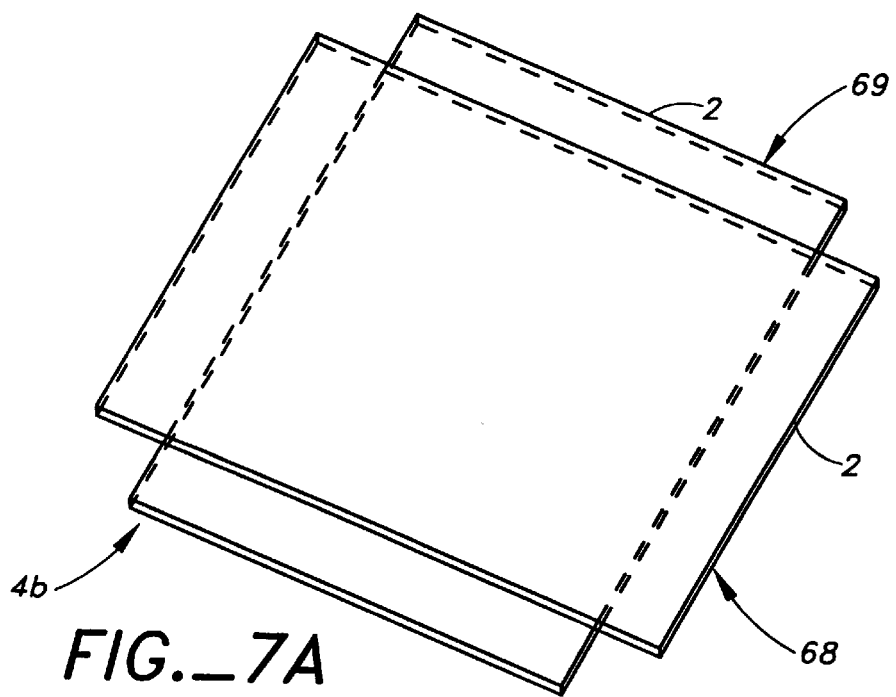
FIG._7A

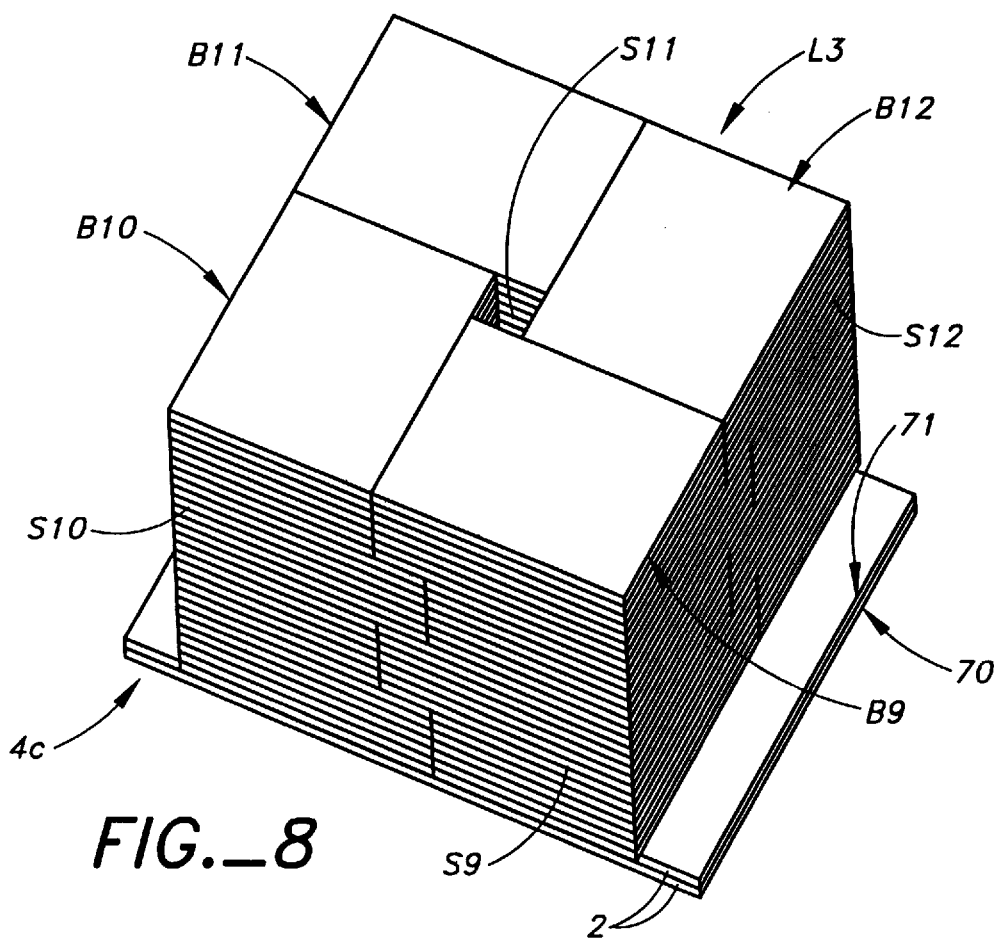
FIG._8
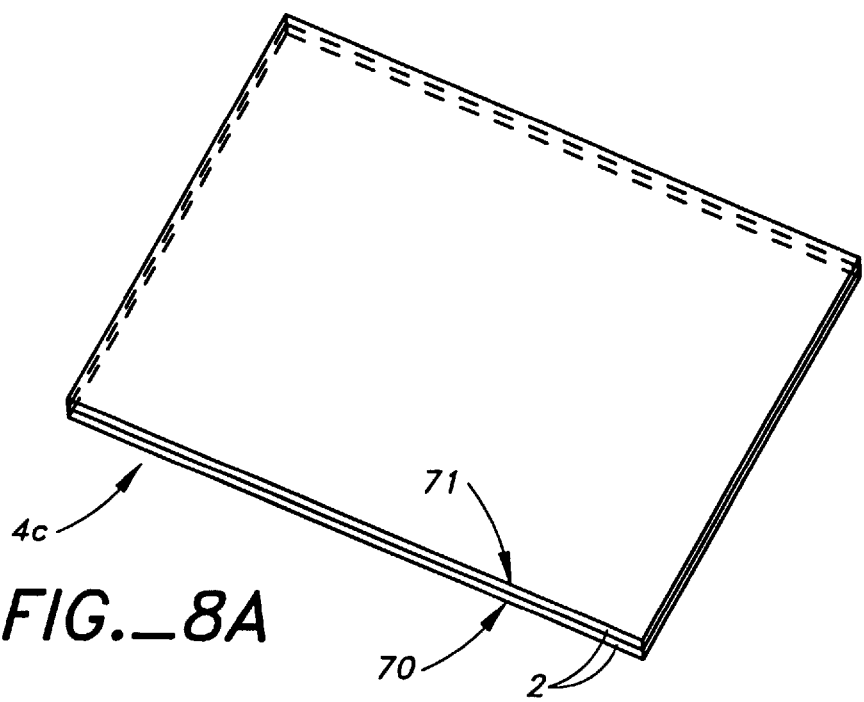
FIG._8A

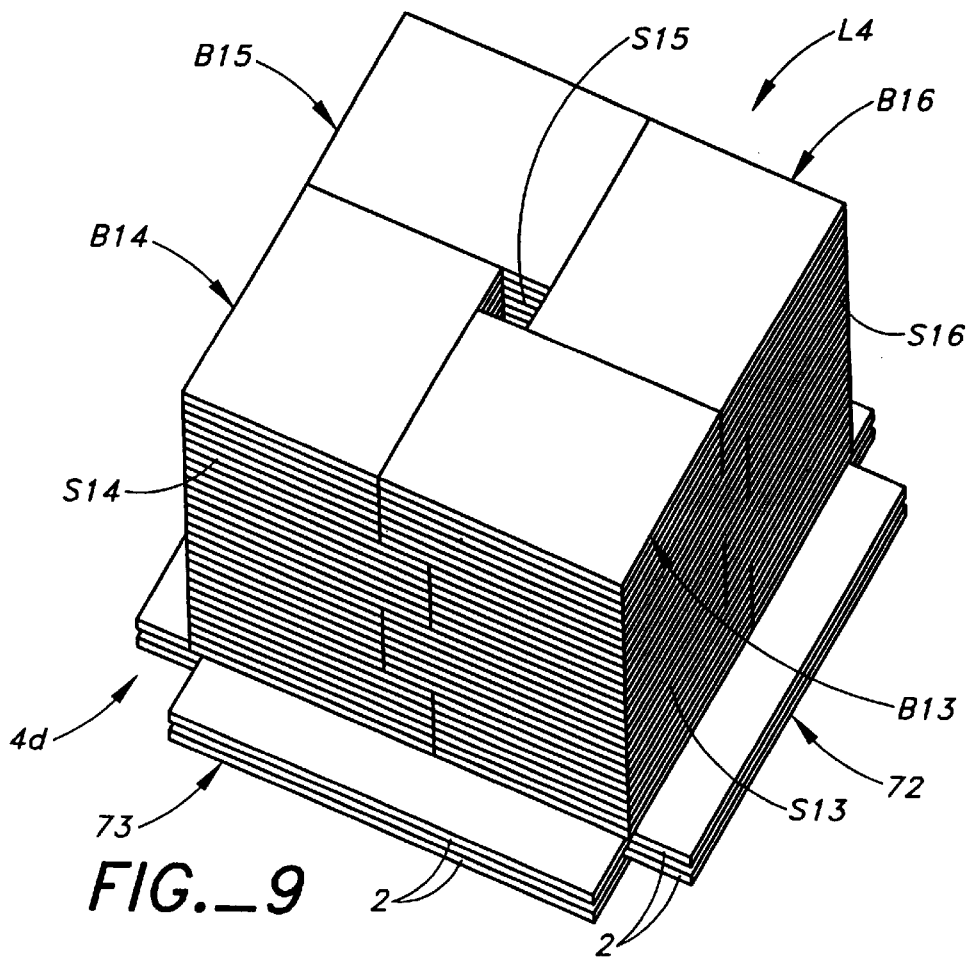
FIG._9
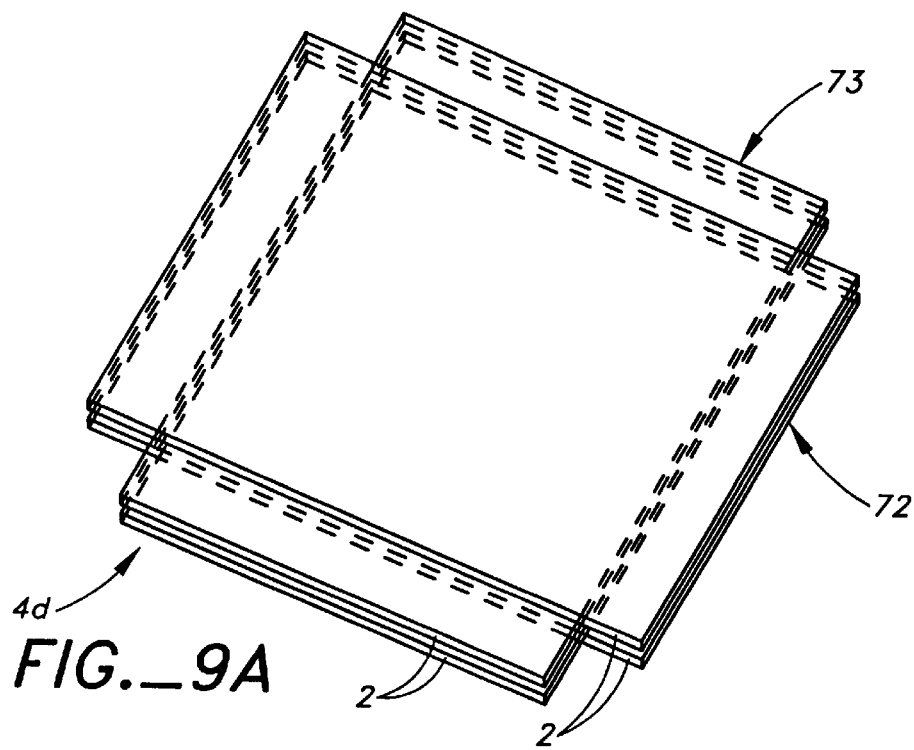
FIG._9A

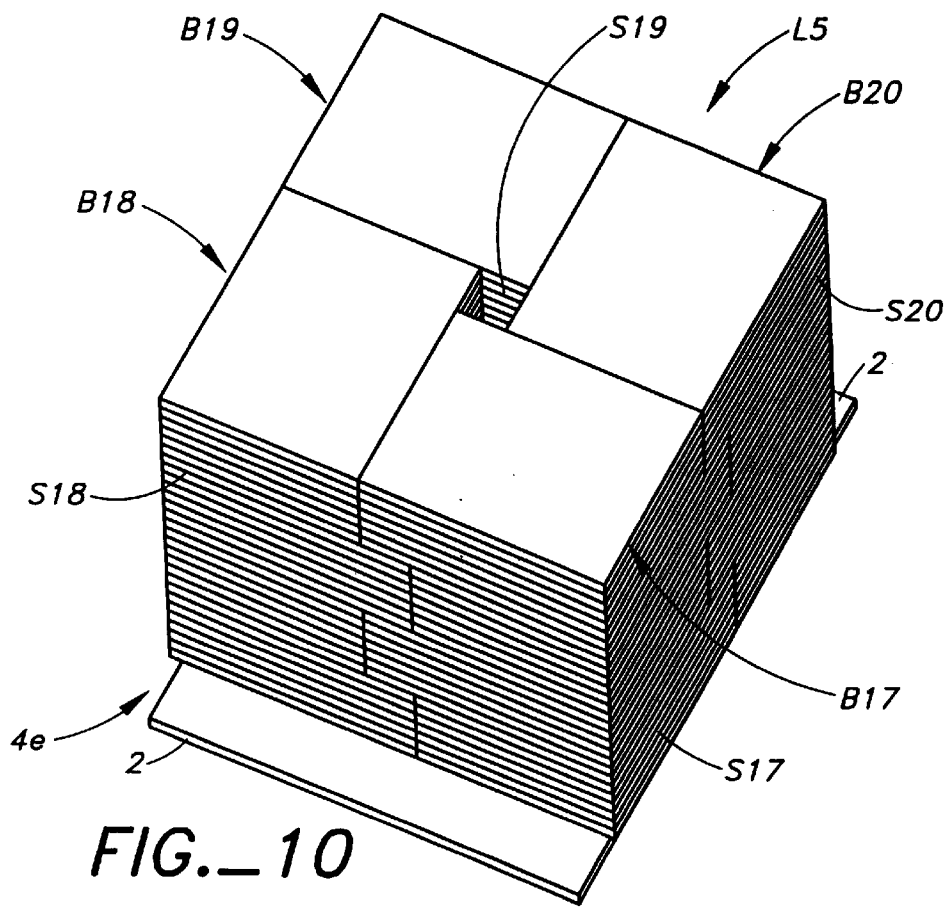
FIG._10
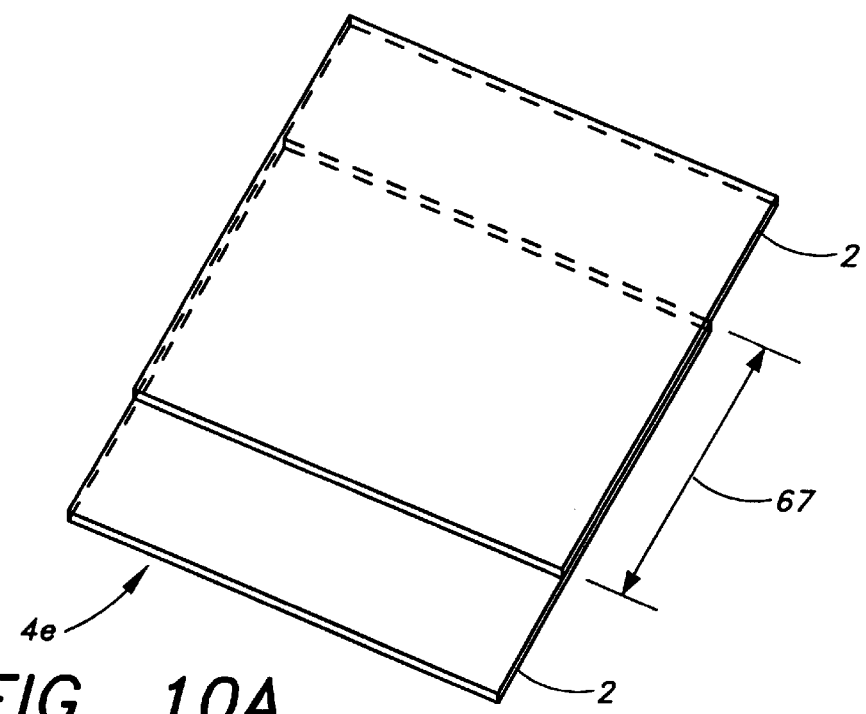
FIG._10A

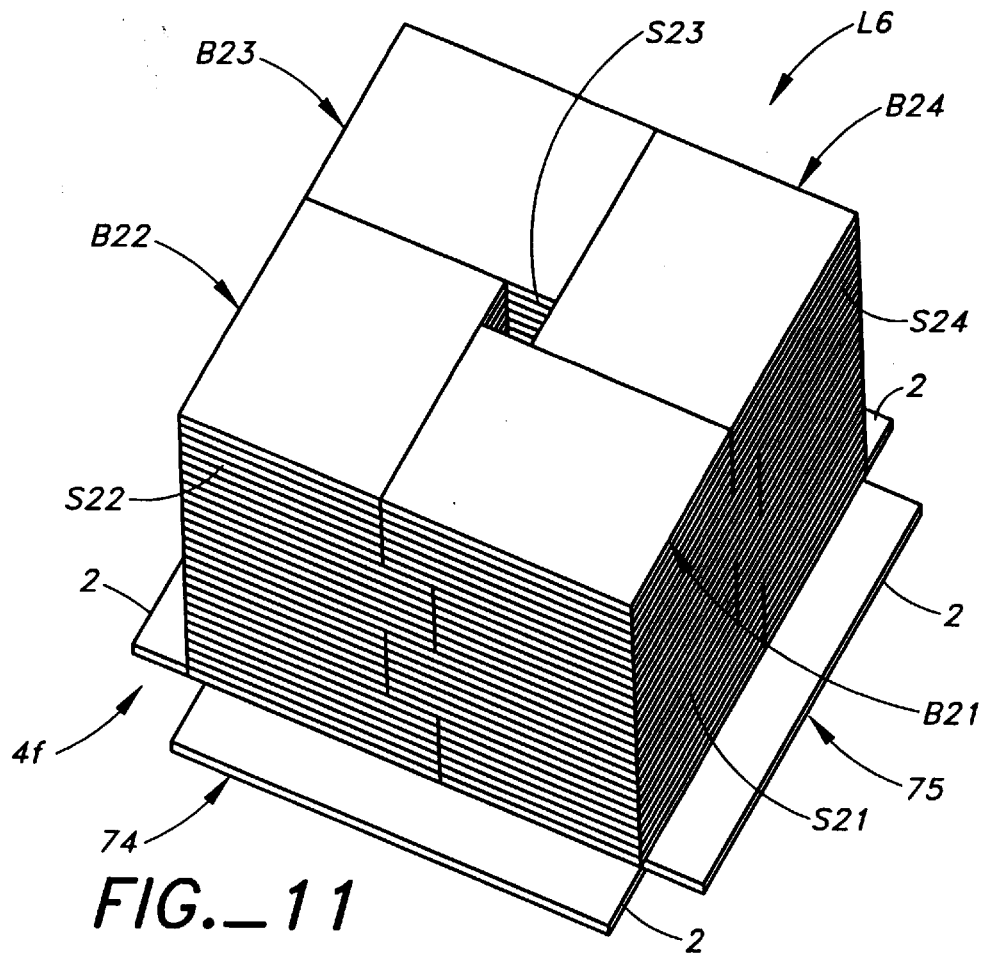
FIG._11
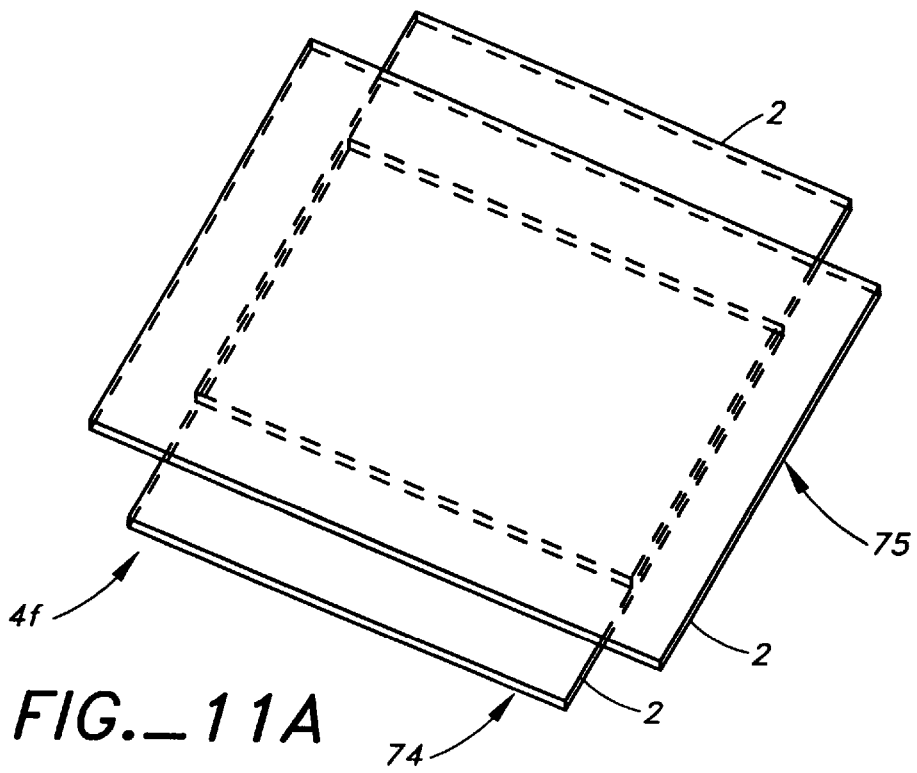
FIG._11A

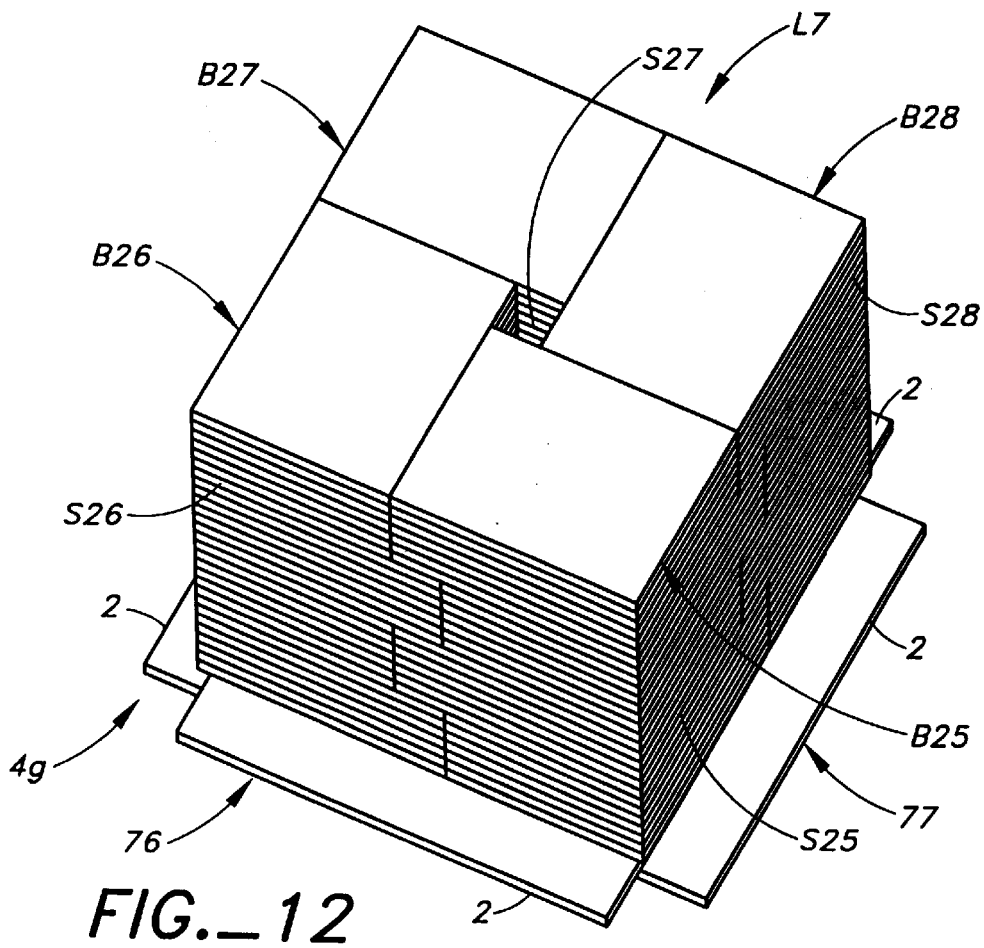
FIG._12
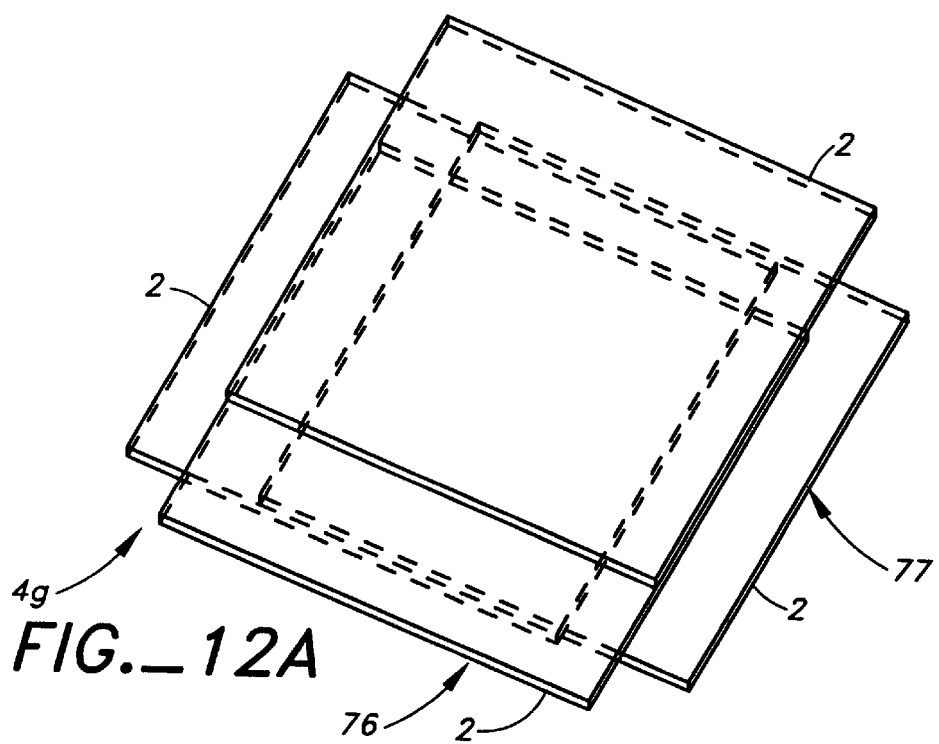
FIG._12A

BOTTOM SHEET DISPENSER FOR LOAD FORMING MACHINERY

BACKGROUND OF THE INVENTION

Load forming machines such as Martin U.S. Re. 35,066 and some stacking machines require that the loads formed by the machine have some means of protecting the bottom surfaces of the loads from the conveyors or pallets on which they are placed and conveyed. Such protection means may be a single cardboard sheet often referred to as a bottom sheet, slip sheet, bottom dunnage, or cap sheet. A single sheet of heavy cardboard taken from a single source is often insufficient to protect the bottom surface of the load due to the fact that the size of the bottom surface area of the load may vary from load to load.

Dual longitudinally spaced bins holding different size bottom sheets have been constructed, but such machines take up an inordinate amount of floor area and are difficult to load. Load forming machines having more than two bins for holding bottom sheets are unknown; most probably due to the excessive floor area that would be required.

The present invention provides an apparatus that can provide multiple bins holding bottom sheets of different sizes and/ or orientation to enable a plurality of laydown patterns to be formed to protect loads of different sizes and orientation being continuously formed by one or more load forming machines or stacking machines.

An object of the present invention is to provide a bottom sheet dispenser which may be loaded from the back during operation of the load forming or stacking machine.

A further object is to provide a bottom sheet feeder which is reliable, simple to operate and maintain and may be adapted to different load forming and stacking machines. Wherever load forming machine is used in this application, it also includes load stacking or other machines unless specifically noted otherwise.

SUMMARY OF THE INVENTION

The gist of the present invention is the use of a plurality of vertically stacked bins in which bottom sheets of varying size and orientation may be placed.

A lifting assembly having vacuum operated devices lifts a single bottom sheet from a bin and a transfer assembly moves each individual sheet longitudinally to a destination where the vacuum is controlled to release the bottom sheet onto a pallet or conveyor.

The lifting assembly may make multiple trips to different bins to build a plurality of different laydown patterns for various load sizes and orientations.

In one form of the invention, the bins may have longitudinal and lateral indexing assemblies.

DESCRIPTION OF THE DRAWINGS

FIG. 1 is a perspective view of the machine of the present invention with portions removed for purposes of viewing and understanding the operation of certain key elements of the apparatus.

FIG. 1A is an enlarged side sectional view of a portion of the machine taken generally along line 1A—1A in FIG. 1 illustrated in FIG. 1 illustrating the multiple vertically stacked bins.

FIG. 1B is an enlarged side sectional view of a portion of the machine taken generally along line 1B—1B in FIG. 1 with portions of the machine removed to more clearly show certain portions of the lifting assembly and the transfer assembly.

FIG. 2 is an enlarged perspective view of portions of the vertically stacked bins, the lifting assembly and the conveyors at the destination location of the machine of the present invention. Various portions of the machine are removed to more clearly illustrate the operation of the lifting assembly with respect to the vertical bins.

FIG. 2A is an enlarged side view of a portion of the vertical bins illustrated in FIG. 2.

FIG. 3 is an enlarged scale perspective view of portions of the lifting assembly mounted on the transfer assembly. Portions of the apparatus have been removed to more clearly view the aforesaid elements and their relation to other elements of the invention.

FIG. 3A is a top plan view of a portion of the machine of the present invention with portions removed for purposes of viewing and understanding the operation of certain key elements of the machine.

FIG. 4 is an enlarged scale perspective view of an alternate form of the invention showing the storage bins, lifting assembly and destination conveyor as illustrated in FIG. 1 as viewed from a generally back side of the bins, but with additional indexing means.

FIG. 5 is an enlarged side view of a portion of the lifting assembly of the present invention.

FIG. 6 is a perspective view of a typical load formed by a load former machine resting on a single bottom sheet oriented longitudinally to the elongated orientation of the load.

FIG. 6A is a perspective view of the bottom sheet illustrated in FIG. 6.

FIG. 7 is a perspective view of a load identical to the load in FIG. 6 with a second bottom sheet laid transverse to the bottom sheet illustrated in FIG. 6A.

FIG. 7A is a perspective view of the cruciform laydown pattern of bottom sheets illustrated in FIG. 7.

FIG. 8 is a perspective view of a typical load resting on a double layer of bottom sheets.

FIG. 8A is a perspective view of the double layer of bottom sheets illustrated in FIG. 8 with the load removed.

FIG. 9 is a perspective view of a typical load resting on a double layered cruciform laydown pattern of bottom sheets.

FIG. 9A is a perspective view of the double layered cruciform laydown pattern illustrated in FIG. 9.

FIG. 10 is a perspective view of a typical load pattern with two overlapped bottom sheets to protect the load. Note that the orientation of the bottom sheets is rotated 90° to the orientation of the bottom sheet illustrated in FIG. 6.

FIG. 10A is a perspective view of the overlapped bottom sheets illustrated in FIG. 10.

FIG. 11 is a perspective view of a cruciform laydown pattern with a single bottom sheet laid at a 90 degree angle to the two overlapped bottom sheets.

FIG. 11 A is a perspective view of the cruciform laydown pattern illustrated in FIG. 11 with the load removed.

FIG. 12 is a perspective view of a typical load resting on a cruciform laydown pattern consisting of two overlapped bottom sheets with two further overlapped bottom sheets oriented 90 degrees to the first overlapped bottom sheets.

FIG. 12A is a perspective view of the cruciform laydown pattern illustrated in FIG. 12 with the load removed.

DESCRIPTION OF THE INVENTION

The bottom sheet storage and feeder apparatus 1 of the present invention for selecting from a plurality of selectively sized and selectively positioned bottom sheets 2 and sequentially moving one or more individual bottom sheets longitudinally to a destination location 3 in a plurality of lay down patterns 4a–4g consists of: a frame 5; a plurality of vertically spaced storage bins 6a–6d mounted on the frame 5, each of the storage bins 6a–6d storing a plurality of selected size positioned bottom sheets 2, and the storage bins 6a–6d being vertically arranged to provide a sheet lifting space 10a–10c therebetween as shown in FIG. 2A; a lifting assembly 11 including at least one vacuum member 12a–12d mounted on the lifting assembly 11 dimensioned to selectively move vertically through a portion of each of the sheet lifting spaces 10a–10c for engaging and lifting an individual bottom sheet 2 from any one or more of the storage bins 6a–6d; and a transfer assembly 13 shown in FIGS. 1B and 3 connected to the lifting assembly 11 for delivering the selected bottom sheet 2 to the destination location 3 in a selected lay down position 4a–4g.

In another form of the invention, a lateral index means is provided to vary the lateral positioning of the bottom sheets at the destination location 3. One form of the lateral index means is illustrated in FIG. 1 wherein at least one lateral index means 9a–9d is provided in storage bins 6a–6d to laterally position bottom sheets 2.

The lateral index means 9a–9d may be belt controlled, manually, or by computer, an indicia mark or an apparatus more fully described below. Bins 6a–6d are designed so that sheets of different sizes may be placed in one or more bins.

The bottom sheet storage and feeder apparatus 1 of the present invention is primarily constructed to dispense one or more bottom sheets 2 which are generally rectangular in shape; but, different geometric shapes may be dispensed. Wherever rectangular or generally rectangular is used, it is to be understood that the shape may be other than rectangular.

In another form of the invention, the orientation of the rectangular bottom sheets 2 in one or more of the storage bins 6a–6d may be different with respect to the leading longitudinal index means 8a–8d; and the lifting assembly 11 and transfer assembly 13 are programmed to successively select one or more bottom sheets 2 from the storage bins 6a–6d thereby creating a selected laydown pattern 4a–4g at the destination location 3 predetermined, in part, by the location of the preselected orientations of the bottom sheets 2.

While some machines may have none or only one longitudinal index means, in the form of the invention illustrated, each of the storage bins 6a–6d have a leading longitudinal index means 8a–8d to longitudinally index the bottom sheets 2.

Preferably the bottom sheet storage and feeder apparatus 1 of the present invention is constructed so that the lateral index means 9a–9d are formed with lateral index members 14a–14d which in at least two of the storage bins 6 may be laterally offset one from the other; and the lifting assembly 11 and transfer assembly 13 are programmed to successively select the bottom sheets 2 from the storage bins 6a–6d thereby creating a laydown pattern 4a–4g at the destination location 3 predetermined by the location of the lateral index members 14a–14d in the storage bins 6a–6d and the size of the bottom sheets 2 in the storage bins 6a–6d.

As shown in FIG. 4, additional lateral index means 9a'–9d' formed with handles 28a'–28d' and grip lock means 31a'–31d' may be provided on the opposite ends of slots 32a–32d formed in rails 30a–30d on bins 6a–6d. These additional lateral index means 9a'–9d' may be used to assist in squaring the stack of bottom sheets 2; prevent sailing of the bottom sheets 2 out of the bins if the vacuum fails on vacuum members 12a–12d; or provide another series of placement locations for the lateral index means 9a'–9d'.

In order to reduce the height of the portion of the frame housing the storage bins 6a–6d, it is preferable to assemble the storage bins 6a–6d in the form of a stairstep arrangement 15 (see e.g. FIG. 1A). This arrangement permits the vacuum members 12a–12d to move in and out of the storage bins 6a–6d with a minimum of vertical clearance between the storage bins 6a–6d.

To accomplish the foregoing, the bottom sheet storage and feeder apparatus 1 for selecting from a plurality of selectively sized and selectively positioned bottom sheets 2 and sequentially moving one or more individual bottom sheets 2 longitudinally to a destination location 3 in a plurality of lay down patterns 4a–4g consists of: a frame 5; a plurality of vertically spaced storage bins 6a–6d mounted on frame 5, such as at one end 7 of the frame 5; each of the storage bins 6a–6d storing a selected size bottom sheet 2 which may be of different sizes and each of the storage bins 6a–6d having a base 17a–17d; the storage bins 6a–6d being arranged in a stair step arrangement 15 wherein the leading longitudinal index means 8a–8d of each of the storage bins 6a–6d from the top storage bin 6a to the lower storage bin 6d successively protrudes outwardly a selected distance creating a sheet lifting space 10a–10c between the leading longitudinal index means 8a–8d of each of the successive storage bins 6a–6d; a lifting assembly 11 including at least one laterally positioned vacuum member 12a–12d mounted on a lifting assembly 11 dimensioned to selectively move vertically through each of the sheet lifting spaces 10a–10c for engaging and lifting an individual bottom sheet 2 from any of the storage bins 6a–6d; and a transfer assembly 13 connected to the lifting assembly 11 for delivering the selected bottom sheet 2 longitudinally to the destination location 3 in a selected lay down pattern 4a–4g.

In another form of the invention, a lateral index means is provided to vary the lateral positioning of the bottom sheets at the destination location 3.

One form of the lateral index means is illustrated in FIG. 1 wherein at least one lateral index means 9a–9d is provided in storage bins 6a–6d to laterally position bottom sheets 2.

Preferably, at least one lateral index means 9a–9d is provided in a storage bin 6a–6d to laterally position bottom sheets 2.

The lateral index means 9a–9d may be belt controlled manually or by computer, an indicia mark or an apparatus more fully described below. Bins 6a–6d are designed so that sheets of different sizes may be placed in one or more bins.

In a preferred form of the invention, a leading longitudinal index means 8a–8d is provided to longitudinally index the bottom sheets 2.

The bottom sheet storage and feeder apparatus 1 having the stair step arrangement 15 may be further constructed so that the bottom sheets 2 are generally rectangular in shape; the orientation of the rectangular bottom sheets 2 in at least two of the storage bins 6 are different with respect to the leading longitudinal index means 8; and the lifting assembly 11 and transfer assembly 13 are programmed to successively select the bottom sheets 2 from the storage bins 6a–6d thereby creating a selected laydown pattern 4a–4g at the destination location 3 predetermined by the location of the preselected orientations of the bottom sheets 2.

The bottom sheet storage and feeder apparatus 1 of the present invention may be constructed to provide a greater number of lay down patterns 4a through 4g by construction of the machines so that the lateral index members 14a–14d in at least two of the storage bins 6a–6d are laterally offset one from the other; and the lifting assembly 11 and transfer assembly 13 are programmed to successively select the bottom sheets 2 from the storage bins 6a–6d thereby creating a laydown pattern 4a–4g at the destination location 3 predetermined by the location of the lateral index members 14a–14d in the storage bins 6a–6d and the size of the bottom sheets 2 in the storage bins 6a–6d.

In order to more easily create a plurality of laydown patterns 4a–4g, the bottom sheet storage and feeder apparatus 1 of the present invention may be constructed so that the leading longitudinal and lateral index means 8a–8d and 9a–9d respectively are members 16a–16b, and 14a–14d respectively which protrude above the bases 17a–17d of each of the storage bins 6a–6d and the lateral index means 9a–9d are laterally adjustable.

The bottom sheet storage and feeder apparatus 1 as generally described above may be constructed more specifically by including: a pair of spaced elongated travel slide bars 18a and 18b mounted on the frame 5 in spaced parallel relation to one another; the transfer assembly 13 includes a pair of travel base members 19a and 19b, shown in FIG. 1B and FIG. 3, each slideably mounted on one of the travel slide bars 18a and 18b; the lifting assembly 11 includes a pair of tower members 20a and 20b, each mounted on one of the travel base members 19a and 19b; a pair of travel chain means 21a and 21b each operably mounted on the frame 5 adjacent and parallel to one of the travel slide bars 18 and each connected to one of the travel base members 19a and 19b of the transfer assembly 13; travel motor means 22 operably connected to the pair of travel chain means 21a and 21b for driving the transfer 13 assembly along the travel slide bars 18a and 18b; a pair of lift slide bars 23a (not shown) and 23b each mounted on one of the tower members 20a and 20b, in parallel relation to each other; lift attachment means 24a (not shown) and 24b (shown in FIG. 3 slideably connecting the lifting assembly 11 to the lift slide bars 23a (not shown) and 23b; a pair of lift chain means 25a and 25b each operably mounted on the tower members 20a and 20b, adjacent and parallel to one of the lift slide bars 23a (not shown) and 23b and each connected to the lifting assembly 11; lift motor means 26 operably connected to the pair of lift chain means 25a and 25b for driving the lifting assembly 11 along the lift slide bars 23a (not shown) and 23b; a computer control 81 and amplifier 82 incorporating electronic gear ratio control system means, as shown in FIG. 3, operably connected to the travel and lift motor means 22 and 26 for selectively coordinating the speed of the travel and lift motor means 22 and for selectively providing lift and travel control for the lifting assembly 11 and the transfer assembly 13; and the lateral index means 9a–9d are laterally adjustable.

Where the word "chain" is used, it may also refer to a flexible power transmitting member such as a timing belt, a cable or other flexible indexible member.

Referring to FIGS. 1, 1A, 2A and 6–12A, bottom sheets 2 may be of various paper, plastic, or other materials capable of protecting the bottom surfaces of the materials being loaded beyond the destination location 3. The materials being loaded in discrete loads L1–L7 may consist of stacks B1–B28 of loose cardboard, stacks of sheet paper or other materials or small packages of materials. The bottom sheets 2 preferably are sheets of cardboard because they are inexpensive, provide cushioning for the stacks of materials as well as good protection from the abrasive effects of the materials moving over conveyor rollers, being stacked on warehouse floors or on wood pallets.

Referring to FIG. 1, frame 5 is only partially shown so that the mechanism may be more clearly perceived. Further, all of the guard panels have been removed from frame 5 to clearly show the working mechanism. With respect to frame 5, it is to be understood that it may be attached to a load former such as the mechanism described in Martin U.S. Re. 35,066 or to some sheet stacking machines (not shown). The bottom sheet feeder of the present invention may be installed in place of the single sheet feeder mechanism F-1 illustrated in FIG. 1 of U.S. Re. 35,066.

Referring to FIGS. 1, 1A, 2, 2A and 4, a plurality of vertically spaced storage bins 6a–6d are illustrated. Preferably, bins 6a–6d slope gently toward the leading longitudinal index means 8a–8d as best shown in FIGS. 1A and 2A to enable the vacuum members 12a–12d to more easily peel off one bottom sheet 2 at a time. The sloping bin also contributes to the bottom sheets 2 staying in engagement with the leading longitudinal index means 8a–8d. The bases 17a–17d of each storage bin are supported by struts 27a–27d. The bins 6a–6d are spaced one above the other a selected distance so that they will be able to hold a reasonable supply of bottom sheets 2 and to provide sufficient space for the easy back loading of bottom sheets 2 either by hand or by machines.

As best shown in FIGS. 1, 1A, 2 and 2A, the bins 6a–6d are staggered in a stair step arrangement 15 so that lifting assembly 11 may move into and out of the bins 6a–6d to remove an individual bottom sheet 2.

As best shown in FIGS. 1, 1A, 2A and 4, lateral index means 9a–9d are provided to initially position bottom sheets 2 laterally. Each of the lateral index members 14a–14d are provided with manually engagable handles 28a–28d so that the lateral index members 14a–14d may be easily moved by means of slide mechanisms 29a–29d, shown in FIG. 1, slideably mounted on rails 30a–30d. Manually engagable grip lock means 31a–31d mounted on slide mechanisms 29a–29d control sliding and frictional grip with slots 32a–32d formed in rails 30a–30d at selected points along rails 30a–30d as best shown in FIG. 4. Slots 32a–32d permit the slide mechanisms 29a–29d to move laterally. By initially positioning bottom sheets 2 at varying lateral positions in bins 6a–6d, different lay down patterns 4a–4g may be easily obtained without the need for complicated programming or complicated mechanisms to provide lateral movement of the lifting assembly 11.

Lifting Assembly 11 is illustrated in FIGS. 1, 1B, 2, 3, 3A, 4, and 5. One or more vacuum members 12a–12d are individually fixedly mounted on cross bar 33 by brackets 34a–34d. A shelf member 35 mounted on cross bar 33 holds a vacuum pump 36 and an air filter 37 shown in FIGS. 2 and 4. Vacuum line 38 is operatively connected to the vacuum pump 36 and by fitting 39 to cross bar 33 which is hollow and serves as a vacuum manifold. Vacuum lines 40a–40d operatively connect vacuum members 12a–12d to the vacuum manifold housed in cross bar 33. Pliable rubber or plastic annular cups 41a–41d are sealably fitted to vacuum members 12a–12d respectively and suctionally engage an individual bottom sheet 2.

At least one vacuum member 12a–12d; and preferably vacuum member 12b, is provided with a sensor, not shown, located at the center of annular cup 41a–41d which senses whether a bottom sheet 2 is stored in storage bin 6a–6d when the vacuum cup 41a–41d is brought into physical contact with the bottom sheet 2. If a bottom sheet 2 is present in the storage bin 6a–6d, spring loaded valves in the cups 41a–41d open thereby selectively applying vacuum to the rubber vacuum member 12a–12d and to the top side of the bottom sheet 2 so that it may be picked up from the storage bin and moved to the destination location 3. Referring to FIG. 5 and FIG. 2, each vacuum member 12a–12d is mounted on brackets 34a–34d so that assemblies 43a–43d may move upwardly with respect to brackets 34a–34d when rubber cups 41a–41d contact bottom sheets 2 in storage bins 6a–6d. Springs 44a–44d return assemblies 43a–43d to the position illustrated in FIG. 5 when the lifting assembly is raised from bins 6a–6d.

A manual vacuum line valve 45 as shown in FIG. 5, e.g. may be provided on the vacuum lines 40a–40d to each vacuum member 12a–12d to turn the vacuum off or on should the machine malfunction, or if less than all of the vacuum members 12a–12d are required to move the bottom sheets 2.

Transfer assembly 13 is illustrated in FIGS. 1, 1B and 3. Travel base members 19a and 19b each carry a pair of pillow blocks 46a–46d as best shown for example in FIG. 3 which respectively slideably connect to spaced elongated travel bars 18a and 18b. Transfer assembly 13 is reciprocally driven along travel bars 18a and 18b by motor 22 operatively connected to transmission 47 which rotates shaft 48 and drive sprockets 49a and 49b keyed thereto. As shown in FIG. 3, an elongated flexible drive member such as travel chain 21b having one end 50b connected to a bracket 51b mounted on tower member 20b and the other end 52b mounted to the other side of bracket 51b is operatively connected to drive sprocket 49b and idler sprocket 53b to reciprocally move tower member 20b.

Tower member 20a is simultaneously moved with tower member 20b by an elongated flexible drive member such as travel chain 21a having one end 50a connected to a bracket 51a mounted on tower member 20a and the other end 52a mounted to the other side of bracket 51a, operatively connected to drive sprocket 49a and idler sprocket 53a.

Tower members 20a and 20b, remain in a vertical position by guide wheels 54a and 54b shown in FIG. 3 which ride on guide rails 55a and 55b shown in FIGS. 1 and 1B.

The second end of lifting assembly 11 is moved vertically in the following manner. Lift motor means 26, as shown in FIG. 3, mounted on frame 5 is operatively connected to transmission 56 which is operatively connected to drive shaft 57. An elongated flexible drive member such as lift chain 25b having one end 58b connected to the upper side of lifting attachment means 24b such as a pillow block attached to cross bar 33 and the other end 59b connected to the lower side of lifting attachment means 24b is operatively connected to drive sprocket 60b mounted for rotation on transmission 56, idler sprocket 61b mounted on travel base member 19b, idler sprocket 62b mounted on tower member 20b, idler sprocket 63b mounted on travel base member 19b, and idler sprocket 64b mounted on frame 5.

The first side of lifting assembly 11 is simultaneously moved along with the second side by lift chain means 25a having one end 58a (not shown) connected to the upper side of lifting attachment means 24a (not shown) such as a pillow block attached to cross bar 33 and the other end 59a (not shown) connected to the lower side of lifting attachment means 24a (not shown, but identical to pillow block 24b. The lift chain means 25a is operatively connected to drive sprocket 60a mounted for rotation on drive shaft 57, idler sprocket 61a shown in phantom line in FIG. 3 mounted on travel base member 19a, idler sprocket 62a mounted on tower member 20a, idler sprocket 63a mounted on travel base member 19a, and idler sprocket 64a mounted on frame 5.

FIG. 1 shows a destination location 3 which may be a fixed platform, but preferably, as shown, is a double series of conveyor rollers 79a and 79b rotatably mounted on stringer members 65a–65d. Rollers 79a and 79b are operatively connected by conventional means to drive shafts 80a and 80b which are driven by motor 66 shown in FIG. 1B. After the bottom sheets 2 are laid down in a selected lay down pattern 4a through 4g on destination location 3, motor 66 is activated and the selected lay down pattern of bottom sheets are conveyed on rollers 79a and 79b to another station in the machine which is not shown where loads L1–L7 as illustrated in FIG. 6–FIG. 12 are deposited by a means not shown. Loads L1–L7 are made up of individual bundles B1–B28 with each bundle B1–B28 being composed of a loose stack of a plurality of individual sheets S1–S28 such as cardboard sheets. The nature of the loads and composition of the loads is not part of the invention and the loads shown are only illustrative of many different loads which can be placed on the bottom sheets.

As may be understood, the lay down patterns 4a–4g as shown in FIG. 6A–FIG. 12A are likewise only illustrative of any number of patterns which may be achieved by the present invention by using different shapes and sizes of bottom sheets 2.

Operation of the Bottom Sheet Storage and Feeder Apparatus

The bottom sheet storage and feeder apparatus of the present invention is operated by a computer 81 which is programmed to make the lay down patterns 4a–4g by the operator pre-selecting the desired pattern. The operator then causes storage bins 6a–6d to be loaded with generally rectangular bottom sheets 2 of selected sizes and selected orientation to make the selected laydown patterns 4a–4g. The operator manually sets the lateral index means 9a–9d to the selected lateral positions, by loosening manually engagable grip lock means 31a–31d and then grasping manually engagable handles 28a–28d one by one and shifting the lateral index members 14a–14d along rails 30a–30d and then tightening the manually engagable grip lock members 31a–31d. If the laydown pattern 4a–4g changes in a selected sequence of specific patterns, as when several load forming machines are connected to the loading station (not shown) which extends beyond conveyors 79a and 79b then, again, the operator can simply program the computer to meet this specific request.

Movement of the lateral index means 9a–9d could be designed to automatically move under the direction of a computer, such as computer 81.

As an example, to form the lay down pattern 4a illustrated in FIGS. 6 and 6A consisting of a single bottom sheet 2, the computer program would energize travel motor 22 and lift motor 26. A well known electronic gear ratio control system, under the direction of computer 81, would select the rotational speed of each motor so that the transfer assembly 13 would move toward one of the computer selected storage bins 6a–6d and raise the lifting assembly 11 to a height which would clear the top of the selected longitudinal index member 16a–16d, cause the transfer assembly 13 to move forwardly so that the vacuum members 12a–12d could move past the selected longitudinal index member 16a–16d and then be lowered downwardly until the rubber cups 41a–41d engaged a selected bottom sheet member 2. Once a bottom sheet member 2 is contacted by a sheet sensor located within one or more of the vacuum cups 41a–41d, the vacuum is directed to the cups and the selected bottom sheet 2 is held tightly to the vacuum cups 41a–41d. The electronic gear ratio control system means, not shown, controlled by computer 81, directs the speeds of motors 22 and 26 to cause the lifting assembly 11 to lift the vacuum cups 41a–41d above the tops of the longitudinal index members 16a–16d and to move the transfer assembly 13 toward the destination location 3. At or near the destination location 3, the cross bar 33 is lowered and at the destination 3, the vacuum may be turned off or a knock down member, not shown, can strike the bottom sheet 2 and deposit the bottom sheet 2 on the conveyor rollers 79a–79d.

Where a crossed sheet pattern is desired, such as laydown pattern 4b, as shown in FIGS. 7 and 7A, the operation is essentially the same except that the transfer assembly 13 must make two separate trips to the storage bins 6a–6d and the lifting assembly 11 must lift a single selected bottom sheet 2 from each of two separate storage bins 6a–6d. The lifting assembly would have to be directed to one storage bin 6a–6d where the bottom sheets 2 were oriented longitudinally and one storage bin 6a–6d where the bottom sheets 2 were oriented laterally. Thus bottom sheet 2 oriented in a longitudinal direction would form the bottom layer 68 and a bottom sheet 2 oriented laterally at 90° to the bottom layer would form the top layer 69.

To make the lay down pattern 4c illustrated in FIGS. 8 and 8A, the operation described above to create the lay down pattern 4a in FIGS. 6 and 6A is simply repeated. The fact that laydown pattern 4c having one bottom sheet forming a bottom layer 70 with another bottom sheet 2 forming a top layer 71 may be placed nearly precisely on top of another attests to the precise control of the machinery achieved under the control of the computer program. The need for dual bottom sheets 2 may be due to the weight of the load to be protected, the need to reduce the amount of bending of the bottom sheets during travel on the conveyors, the condition of the storage facilities where the loads are stored, the need to provide protection from the load straps, or the need to prevent wear and tear on the bottom sheets during loading and unloading before the load reaches its final destination.

Referring to FIGS. 9 and 9A, the laydown pattern 4d consists of placing double bottom sheets 2 forming a bottom layer 72 and double bottom sheets on top forming a top layer 73 oriented at 90° to the two bottom sheets on the bottom layer 72. To achieve the laydown pattern 4d, the transfer assembly 13 must make four trips from storage bins 6a–6d to the destination location 3 and select bottom sheet 2 from two separate bins. The operation of the machine to achieve the laydown pattern 4d is a combination of the operation described to make the laydown patterns 4b and 4c described above.

FIGS. 10 and 10A illustrate still another laydown pattern 4e. In laydown pattern 4e two bottom sheets 2 are overlapped. The bottom sheets illustrated have the same width and the same length and could be drawn from a single storage bin 6a–6d. Overlapping could be achieved by simply programming the computer to direct transfer assembly 13 to move and drop the bottom sheet 2 at two different longitudinal destination locations 3.

Another way to make laydown pattern 4e would be to select different length bottom sheets 2 from two different storage bins 6a–6d, and program the computer to deposit the two bottom sheets 2 at different longitudinal destination locations to adjust the amount of overlap 67 indicated by the double arrows.

FIGS. 11 and 11A illustrate still another crossed laydown pattern 4f in which a bottom layer 74 is formed by two overlapped bottom sheets 2 following the operation of the machine described above for forming the laydown pattern 4e illustrated in FIG. 10A. A top layer 75 is formed by placing a bottom sheet 2 at a position oriented at 90° to the bottom layer 74. To make the cross pattern illustrated in FIG. 11A requires the transfer assembly 13 to make two trips to the storage bins 6a–6d to make the bottom layer 74 and one trip to the storage bins 6a–6d to make the top layer 75 following the procedure described for making the laydown pattern 4a.

The crossed laydown pattern 4g illustrated in FIGS. 12 and 12A is still another cross pattern in which the four bottom sheets 2 used to make the pattern 4g could be drawn from two separate storage bins or a single sheet could possibly be withdrawn from each of the four storage bins 6a–6d. The bottom layer 76 is made up of two overlapped bottom sheets 2 and the top layer 77 is made up of two overlapped bottom sheets 2 oriented at 90° to the bottom layer 76 similar to the procedures in forming laydown patterns 4b and 4e.

I claim:

1. A bottom sheet storage and feeder apparatus for selecting from a plurality of selectively sized and selectively positioned bottom sheets and sequentially moving one or more of said individual bottom sheets longitudinally to a generally horizontal destination location in a plurality of generally horizontal lay down patterns comprising:
   a. a frame;
   b. a plurality of vertically spaced storage bins mounted on said frame, each of said vertically spaced storage bins having a base and storing a plurality of selected size bottom sheets on said bases and said vertically spaced storage bins being vertically arranged to provide a sheet lifting space therebetween;
   c. a lifting assembly including a vacuum member mounted on said lifting assembly dimensioned to selectively move vertically through a portion of each of said sheet lifting spaces for engaging and lifting at least an individual bottom sheet from any one or more of said storage bins; and
   d. a transfer assembly connected to said lifting assembly for delivering said selected bottom sheet to said generally horizontal destination location in a selected generally horizontal lay down pattern.

2. A bottom sheet storage and feeder apparatus as described in claim 1 comprising:
   a. lateral index means providing selected lateral positions for said bottom sheets in said selected generally horizontal lay down patterns at said generally horizontal destination location.

3. A bottom sheet storage and feeder apparatus as described in claim 2 wherein:
   a. said vertically spaced storage bins include first and second lateral edges;
   b. said lateral index means is located in at least one of said vertically spaced storage bins and is positioned with respect to said first lateral edge to laterally position said bottom sheets; and
   c. each of said vertically spaced storage bins having a leading longitudinal index means to longitudinally index said bottom sheets.

4. A bottom sheet storage and feeder apparatus as described in claim 3 wherein:
   a. said bottom sheets are generally rectangular in shape having a length greater than their width and each formed with a shorter edge and a longer edge;
   b. the selected lateral positions of said generally rectangular bottom sheets in at least two of said vertically spaced storage bins are different with respect to said leading longitudinal index means such that said shorter edge of one of said bottom sheets abuts said leading longitudinal index means of at least one of said storage bins and said longer edge of at least one other of said bottom sheets abuts said leading longitudinal index means of at least one other of said storage bins;

c. said lifting assembly includes a plurality of vacuum members; and d. said transfer assembly is programmed to successively select said bottom sheets from said vertically spaced storage bins thereby creating a selected generally horizontal laydown pattern at said generally horizontal destination location predetermined by the location of said preselected orientations of said bottom sheets.

5. A bottom sheet storage and feeder apparatus as described in claim 3 wherein:

a. said lateral index means are formed with lateral index members which in at least two of said vertically spaced storage bins are laterally offset one from the other; and b. said transfer assembly is programmed to successively select said bottom sheets from said vertically spaced storage bins thereby creating a generally horizontal laydown pattern at said generally horizontal destination location predetermined by the location of said lateral index members in said storage bins and the size of said bottom sheets in said vertically spaced storage bins.

6. A bottom sheet storage and feeder apparatus as described in claim 3 wherein:

a. said leading longitudinal and lateral index means are members which protrude above said bases of each of said storage bins; and b. said lateral index means are laterally adjustable.

7. A bottom sheet storage and feeder apparatus as described in claim 3 wherein:

a. at least one of said vertically spaced storage bins includes a lateral index means positioned with respect to said second lateral edge.

8. A bottom sheet storage and feeder apparatus as described in claim 3 wherein:

a. said plurality of said vertically spaced storage bins include a lateral index means positioned with respect to the second lateral edge of said vertically spaced storage bins.

9. A bottom sheet storage and feeder apparatus as described in claim 1 comprising:

a. a pair of spaced elongated travel slide bars mounted on said frame in spaced parallel relation to one another;

b. said transfer assembly includes a pair of travel base members each slideably mounted to one of said travel slide bars;

c. said lifting assembly includes a pair of tower members each mounted on one of said travel base members;

d. a pair of travel chain means each operably mounted on said frame adjacent and parallel to one of said travel slide bars and each connected to one of said travel base members of said transfer assembly;

e. travel motor means operably connected to said pair of travel chain means for driving said transfer assembly along said travel slide bars;

f. a pair of lift slide bars each mounted on one of said tower members in parallel relation to each other;

g. lift attachment means slideably connecting said lifting assembly to said lift slide bars;

h. a pair of lift chain means each operably mounted on said tower members adjacent and parallel to one of said lift slide bars and each connected to said lifting assembly;

i. lift motor means operably connected to said pair of lift chain means for driving said lifting assembly along said lift slide bars;

j. a computer control incorporating electronic gear ratio control system means operably connected to said travel and lift motor means for selectively coordinating the speed of said travel and lift motor means for selectively providing lift and travel control for said lifting assembly and said transfer assembly; and k. laterally adjustable index means providing a plurality of selected lateral positions in at least one of said bins for forming said bottom sheets in said selected generally horizontal lay down patterns at said generally horizontal destination location.

10. A bottom sheet storage and feeder apparatus for selecting from a plurality of selectively sized and selectively positioned bottom sheets and sequentially moving one or more individual bottom sheets longitudinally to a destination location in a plurality of lay down patterns comprising:

a. a frame;

b. a plurality of vertically spaced storage bins mounted on said frame; each of said vertically spaced storage bins having a base and storing a plurality of selected size bottom sheets on said bases and said vertically spaced storage bins being arranged in a stair step arrangement wherein a leading longitudinal index means of each of said storage bins from a top storage bin to a lower storage bin successively protrudes outwardly a selected distance creating a sheet lifting space between said leading longitudinal index means of each of said successive storage bins;

c. a lifting assembly including a vacuum member mounted on said lifting assembly dimensioned to selectively move vertically through each of said sheet lifting spaces for engaging and lifting at least an individual bottom sheet from any of said storage bins; and d. a transfer assembly connected to said lifting assembly for delivering said selected bottom sheet longitudinally to said destination location in a selected lay down pattern.

11. A bottom sheet storage and feeder apparatus as described in claim 10 comprising:

a. lateral index means providing selected lateral positions for said bottom sheets in said selected lay down patterns at said destination location.

12. A bottom sheet storage and feeder apparatus as described in claim 11 wherein:

a. said storage bins include first and second lateral edges;

b. said lateral index means is located in at least one of said storage bins and is positioned with respect to said first lateral edge to laterally position said bottom sheets; and c. each of said storage bins having a base and said leading longitudinal index means to longitudinally index said bottom sheets.

13. A bottom sheet storage and feeder apparatus as described in claim 12 wherein:

a. said bottom sheets are generally rectangular in shape having a length greater than its width forming a shorter edge and a longer edge;

b. the selected lateral positions of said generally rectangular bottom sheets in at least two of said storage bins are different with respect to said leading longitudinal index means such that said shorter edge of one of said bottom sheets abuts said longitudinal index means of at least one said storage bins and said longer edge of at least one other of said bottom sheets abuts said longitudinal index means of at least one other of said storage bins;

c. said lifting assembly includes a plurality of vacuum members; and d. said transfer assembly is programmed to successively select said bottom sheets from said storage bins thereby creating a selected laydown pattern at said destination location predetermined by the location of said selected lateral positions of said bottom sheets.

14. A bottom sheet storage and feeder apparatus as described in claim 12 wherein:

a. said leading longitudinal and lateral index means are members which protrude above said bases of each of said storage bins; and b. said lateral index means are laterally adjustable.

15. A bottom sheet storage and feeder apparatus as described in claim 12 wherein:

a. at least one of said storage bins includes a lateral index means positioned with respect to said second lateral edge.

16. A bottom sheet storage and feeder apparatus as described in claim 12 wherein:

a. a plurality of said storage bins include a lateral index means positioned with respect to the second lateral edge of said storage bins.

17. A bottom sheet storage and feeder apparatus as described in claim 10 wherein:

a. said lateral index means are formed with lateral index members which in at least two of said storage bins are laterally offset one from the other; and b. said transfer assembly is programmed to successively select said bottom sheets from said storage bins thereby creating a laydown pattern at said destination location predetermined by the location of said lateral index members in said storage bins and the size of said bottom sheets in said storage bins.

18. A bottom sheet storage and feeder apparatus as described in claim 10 comprising:

a. a pair of spaced elongated travel slide bars mounted on said frame in spaced parallel relation to one another;

b. said transfer assembly includes a pair of travel base members each slideably mounted to one of said travel slide bars;

c. said lifting assembly includes a pair of tower members each mounted on one of said travel base members;

d. a pair of travel chain means each operably mounted on said frame adjacent and parallel to one of said travel slide bars and each connected to one of said travel base members of said transfer assembly;

e. travel motor means operably connected to said pair of travel chain means for driving said transfer assembly along said travel slide bars;

f. a pair of lift slide bars each mounted on one of said tower members in parallel relation to each other;

g. lift attachment means slideably connecting said lifting assembly to said lift slide bars;

h. a pair of lift chain means each operably mounted on said tower members adjacent and parallel to one of said lift slide bars and each connected to said lifting assembly;

i. lift motor means operably connected to said pair of lift chain means for driving said lifting assembly along said lift slide bars;

j. a computer control incorporating electronic gear ratio control system means operably connected to said travel and lift motor means for selectively coordinating the speed of said travel and lift motor means for selectively providing lift and travel control for said lifting assembly and said transfer assembly; and k. laterally adjustable index means providing a plurality of selected lateral positions in at least one of said vertically spaced storage bins for forming said bottom sheets in said plurality of lay down patterns at said destination location.

19. A bottom sheet storage and feeder apparatus for selecting from a plurality of selectively sized and selectively positioned bottom sheets and sequentially moving one or more of said individual bottom sheets longitudinally to a generally horizontal destination location in a plurality of generally horizontal lay down patterns comprising:

a. a frame;

b. a plurality of vertically spaced storage bins mounted on said frame, each of said vertically spaced storage bins having a base and storing a plurality of selected size bottom sheets on said bases and said vertically spaced storage bins being vertically arranged;

c. a lifting assembly including a vacuum member mounted on said lifting assembly dimensioned to selectively move for engaging and lifting at least an individual bottom sheet from any one or more of said vertically spaced storage bins; and d. a transfer assembly connected to said lifting assembly for delivering said selected bottom sheet to said generally horizontal destination location in a selected generally horizontal lay down pattern.

* * * * *

UNITED STATES PATENT AND TRADEMARK OFFICE
CERTIFICATE OF CORRECTION

PATENT NO. : 5,813,826
DATED : September 29, 1998
INVENTOR(S) : Merrill D. Martin, et al It is certified that error appears in the above-identified patent and that said Letters Patent is hereby corrected as shown below:

Column 5, line 51, after "means 22 and", insert --26--.

Signed and Sealed this

Twenty-third Day of March, 1999

Attest:

Q. TODD DICKINSON

Attesting Officer

Acting Commissioner of Patents and Trademarks